United States Patent
Nagase

(10) Patent No.: US 9,511,518 B2
(45) Date of Patent: Dec. 6, 2016

(54) FORMED LIGNEOUS BODY, AND METHOD OF PRODUCING THE SAME

(71) Applicant: KOJIMA INDUSTRIES CORPORATION, Toyota-Shi (JP)

(72) Inventor: Kimihiro Nagase, Kasugai (JP)

(73) Assignee: Kojima Industries Corporation, Toyota-Shi (JP)

( * ) Notice: Subject to any disclaimer, the term of this patent is extended or adjusted under 35 U.S.C. 154(b) by 0 days.

(21) Appl. No.: 14/339,545

(22) Filed: Jul. 24, 2014

(65) Prior Publication Data
US 2015/0093549 A1 Apr. 2, 2015

(30) Foreign Application Priority Data
Oct. 1, 2013 (JP) .................................. 2013-206065

(51) Int. Cl.
B29C 43/00 (2006.01)
B27D 1/00 (2006.01)
(Continued)

(52) U.S. Cl.
CPC .............. *B29C 43/003* (2013.01); *B27D 1/00* (2013.01); *B27D 1/08* (2013.01); *B27D 1/083* (2013.01);
(Continued)

(58) Field of Classification Search
CPC ........... B29C 43/003; B27D 1/00; B27D 1/08; B27D 1/083; B32B 3/00
See application file for complete search history.

(56) References Cited

U.S. PATENT DOCUMENTS

| 2,488,301 A | 11/1949 | Lundstrom |
| 2004/0088946 A1 | 5/2004 | Liang et al. |

(Continued)

FOREIGN PATENT DOCUMENTS

| CN | 86 1 01814 A | 11/1986 |
| CN | 101428431 A | 5/2009 |

(Continued)

OTHER PUBLICATIONS

European Search Report, European Application No. 14186908.1, dated Feb. 11, 2015 (8 pages).
(Continued)

*Primary Examiner* — Betelhem Shewareged
(74) *Attorney, Agent, or Firm* — Burr & Brown, PLLC

(57) ABSTRACT

A formed ligneous body is provided which has high scratch-proof, water-proof and weather-proof properties, a decorative design surface with a natural and fine woody grain, a high degree of aesthetic dignity and a high ligneous property. The formed ligneous body includes a surface layer portion of-fiber cells of which are impregnated with a first resin material in a cured state and which has a decorative design surface, and a base layer portion of fiber cells of which are impregnated with a second resin material in a cured state. The surface layer portion and the base layer portion are formed integrally with each other in a flow molding process, and an amount of change of relative positions of the fiber cells of the surface layer portion during the flow molding process is less than that of the fiber cells of the base layer portion during the flow molding process.

12 Claims, 14 Drawing Sheets

(51) Int. Cl.
  *B27D 1/08* (2006.01)
  *B27M 1/02* (2006.01)
  *B27N 7/00* (2006.01)
  B29K 1/00 (2006.01)
  B29L 9/00 (2006.01)
  B32B 3/00 (2006.01)

(52) U.S. Cl.
  CPC ............. *B27M 1/02* (2013.01); *B27N 7/005* (2013.01); *B29K 2001/00* (2013.01); *B29L 2009/00* (2013.01); *B32B 3/00* (2013.01); *Y10T 428/24802* (2015.01)

(56) References Cited

U.S. PATENT DOCUMENTS

2013/0055583 A1* 3/2013 Hackl ................ B29C 47/1018
  34/380
2014/0004314 A1* 1/2014 Durand .................. B29C 33/06
  428/174

FOREIGN PATENT DOCUMENTS

| GB | 218634 A | 9/1925 |
| GB | 548244 | 10/1942 |
| IE | 57230 B1 | 6/1992 |
| JP | 53-145904 A | 12/1978 |
| JP | 4502848 B2 | 7/2010 |
| JP | 4849609 B2 | 1/2012 |

OTHER PUBLICATIONS

Chinese Office Action (With English Translation), Chinese Application No. 201410479734.2, dated Jan. 19, 2016 (19 pages).

* cited by examiner

FIG. 3
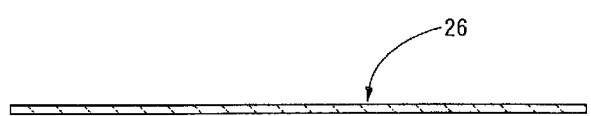
(a)
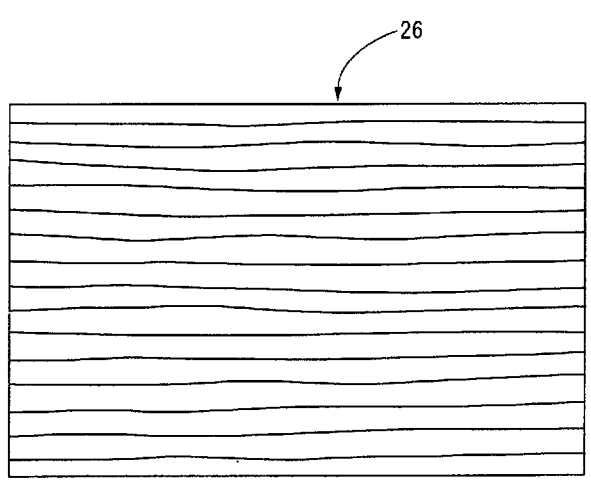
(b)

FIG. 4
(a)
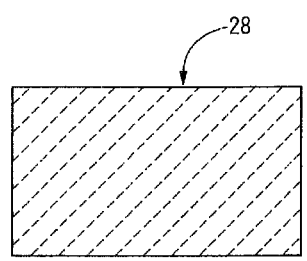
(b)
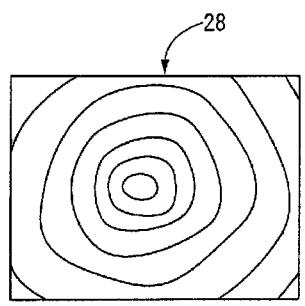

FIG. 10
(a)
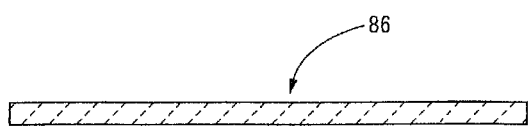
(b)
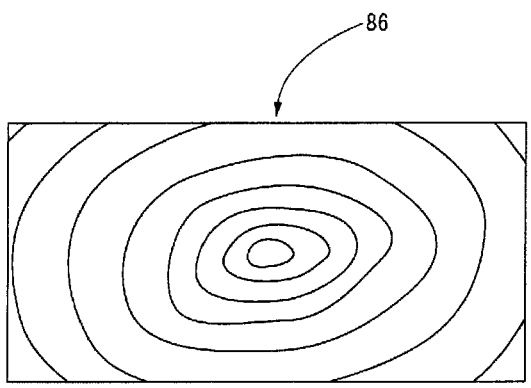

FORMED LIGNEOUS BODY, AND METHOD OF PRODUCING THE SAME

The present application is based on Japanese Patent Application No. 2013-206065 filed on Oct. 1, 2013 the contents of which are incorporated herein by reference.

BACKGROUND OF THE INVENTION

1. Field of the Invention

The present invention relates generally to a formed ligneous body, and a method of producing the same, and more particularly to a formed ligneous body having a desired three-dimensional shape, and a method which permits advantageous production of the formed ligneous body.

2. Description of Related Art

There have been widely used formed ligneous bodies formed of various kinds of lumber (timber) and bamboo, as components of architectural floor panels, furniture and fittings. Further, there has been a growing demand for interior parts of automotive vehicles having the texture or appearance of wood, keeping pace with a recently increased desire for enhancement of quality of the vehicles. To meet this growing demand, formed ligneous bodies have been increasingly utilized as outer panels and surface panels of the interior parts of the automotive vehicles.

By the way, various kinds of formed ligneous bodies are available. For example, the known formed ligneous bodies are produced by extrusion or pressing of a mixture of a ligneous material in the form of a particulate mass or chips of lumber or bamboo and a thermoplastic resin material, or by insert injection molding using a sliced veneer as an insert, so that the formed ligneous body consists of the sliced veneer as a surface layer portion, and a base layer of a resin material integral with the surface layer portion. These formed ligneous bodies produced by the above-indicated extrusion, pressing and insert injection molding are advantageous for easier production. However, those formed ligneous bodies, which include a large amount of a resinous material, are not considered preferable from the standpoint of preservation of resources and environments, and suffer from a disadvantage in terms of aesthetic dignity and texture as compared with those of a genuine lumber body. The ligneous properties of the formed ligneous body produced by the insert injection molding using the sliced veneer are further deteriorated in the presence of a coating layer (topcoat layer) in the form of a transparent film, which is provided to cover the sliced veneer, for the purpose of improving scratch- or flaw-, water- and weather-proof properties of the surface layer of the sliced veneer.

In view of the prior art described above, Japanese Patent No. 4502848 and Japanese Patent No. 4849609 disclose a formed ligneous body produced by utilizing a so-called "flow molding" process, and a method of producing such a formed ligneous body. According to the flow molding process disclosed in the above-identified publications, a ligneous material is accommodated in a forming cavity formed in a mold, and is heated and pressed to apply shearing forces to fiber cells (cellulose) which are dead cells constituting a fibrous structure of the ligneous material, so that the relative positions of the fiber cells are changed to cause the ligneous material to flow so as to fill the forming cavity with the ligneous material, and so that the ligneous material filling the forming cavity is compressed into a shape following the shape of the forming cavity, whereby the formed ligneous body having the desired shape is produced. Prior to this flow molding operation, a pretreatment is conducted to cut hydrogen bonds among the fiber cells of the ligneous material. For instance, this pretreatment is conducted to control a water content of the ligneous material to a desired value, or to impregnate the wall structure of the fiber cells with a resin material, for example, so that water molecules and molecules of the resin material are adsorbed among molecular chains of the fiber cells cross-linked by the hydrogen bonds, with a result of cutting of the hydrogen bonds among the fiber cells.

Unlike conventional formed ligneous bodies produced by using the prior art ligneous material and resin material, the formed ligneous body produced by utilizing the flow molding process described above does not use a resin material at all, or requires the use of a resin material by only an extremely small amount. Accordingly, the flow molding process has not only an advantage regarding the preservation of resources and environment, but also an advantage of presenting a genuine lumber feel. Further, the formed ligneous body produced by using the ligneous material the fiber cells of which are impregnated with a resin material has an advantage of high degrees of the scratch-, water-, and weather-proof properties of its surface portion, even where the surface portion is not covered by the coating layer in the form of the transparent film.

However, the formed ligneous body produced by utilizing the flow molding process having the several advantages suffers from the following drawback. Namely, the flow of the entirety of the ligneous material within the forming cavity undesirably causes a high risk that the formed ligneous body has surface patterns or figures which are far different from, or deformed with respect to a natural wood grain, or aesthetically deteriorated. Thus, the technique to produce the formed ligneous body by utilizing the conventional flow molding process has extreme difficulty to obtain the formed ligneous body having a decorative design surface with a natural and fine woody grain in at least a portion of its surface.

SUMMARY OF THE INVENTION

The present invention was made in view of the background art described above. It is therefore an object of this invention to provide a formed ligneous body which has high degrees of scratch-, water- and weather-proof properties, presents a genuine lumber feel, and has a decorative design surface with a natural and fine woody grain, and high degrees of aesthetic dignity and ligneous properties. Another object of this invention is to provide a method of advantageously producing the formed ligneous body.

The object indicated above regarding the formed ligneous body can be achieved according to a first aspect of the present invention, which provides a formed ligneous body having a surface at least a part of which serves as a decorative design surface, and a non-decorative back surface, the formed ligneous body being produced by subjecting a ligneous material wherein hydrogen bonds among fiber cells have been cut, to a flow molding process wherein the ligneous material is heated and pressed in a forming cavity, to apply shearing forces to the fiber cells to change relative positions of the fiber cells, for permitting flows of the ligneous material to fill the forming cavity, and the ligneous material filling the forming cavity is compressed and shaped, the formed ligneous body comprises: a surface layer portion having the decorative design surface; and a base layer portion which is a remainder of the formed ligneous body other than the surface layer portion and which is formed integrally with the surface layer portion, and wherein the fiber cells of the surface layer portion are impregnated with a first resin material in a cured state, while the fiber cells of the base layer portion are impregnated with a second resin material in a cured state, the surface layer portion and the base layer portion being formed in the flow molding process such that an amount of change of the relative positions of the fiber cells of the surface layer portion caused in the flow molding process is smaller than an amount of change of the relative positions of the fiber cells of the base layer portion caused in the flow molding process.

The object indicated above regarding the formed ligneous body can also be achieved according to a second aspect of the present invention, which provides a formed ligneous body having a surface at least a part of which serves as a decorative design surface, and a non-decorative back surface, the formed ligneous body being produced by subjecting a ligneous material wherein hydrogen bonds among fiber cells have been cut, to a flow molding process wherein the ligneous material is heated and pressed in a forming cavity, to apply shearing forces to the fiber cells to change relative positions of the fiber cells, for permitting flows of the ligneous material to fill the forming cavity, and the ligneous material filling the forming cavity is compressed and shaped, the formed ligneous body comprises: a surface layer portion having the decorative design surface; and a base layer portion which is a remainder of the formed ligneous body other than the surface layer portion and which is formed integrally with the surface layer portion, and wherein the fiber cells of the surface layer portion are impregnated with a first resin material in a cured state, while the fiber cells of the base layer portion are impregnated with a second resin material in a cured state, only the base layer portion being formed in the flow molding process.

The object indicated above regarding the method of producing the formed ligneous body can be achieved according to a third aspect of the invention, which provides a method of producing a formed ligneous body having a surface at least a part of which serves as a decorative design surface, and a non-decorative back surface, by subjecting a ligneous material wherein hydrogen bonds among fiber cells have been cut, to a flow molding process wherein the ligneous material is heated and pressed in a forming cavity, to apply shearing forces to the fiber cells to change relative positions of the fiber cells, for permitting flows of the ligneous material to fill the forming cavity, and the ligneous material filling the forming cavity is compressed and shaped, the method comprising: a step of providing, as the ligneous material, a surface-layer-portion ligneous material for forming a surface layer portion having the decorative design surface, and a base-layer-portion ligneous material for forming a base layer portion which is a remainder of the formed ligneous body other than the surface layer portion; a step of impregnating the fiber cells of the surface-layer-portion ligneous material with a first resin material; a step of impregnating the fiber cells of the base-layer-portion ligneous material with a second resin material; a step of accommodating, in the forming cavity, the surface-layer-portion ligneous material which has been impregnated with the first resin material, and the base-layer-portion ligneous material which has been impregnated with the second resin material, such that the surface-layer-portion ligneous material and the base-layer-portion ligneous material are superposed on each other; a step of curing the first resin material contained in the surface-layer-portion ligneous material accommodated in the forming cavity to form the surface layer portion; and a step of subjecting the base-layer-portion ligneous material accommodated in the forming cavity to the flow molding process such that the base-layer-portion ligneous material is compressed in a direction of mutual superposition of the surface-layer-portion ligneous material and the base-layer-portion ligneous material, while substantially preventing deformation of the surface layer portion formed in the forming cavity, which deformation would cause an enlargement of an area of the decorative design surface, the second resin material contained in the base-layer-portion ligneous material being subsequently cured to form the base layer portion integrally with the surface layer portion formed in the forming cavity.

The expression "substantially preventing deformation of the surface layer portion, which would cause an enlargement of an area of the decorative design surface" is interpreted to comprehend "complete prevention of deformation of the surface layer portion which would cause an enlargement of the area of the decorative design surface", and "permission of an amount of deformation of the surface layer portion that is small enough to prevent deformation or collapse of a woody grain of the decorative design surface, and prevention of an amount of deformation of the surface layer portion larger than the above-indicated upper limit".

The object indicated above regarding the method of producing the formed ligneous body can also be achieved according to a fourth aspect of this invention, which provides a method of producing a formed ligneous body having a surface at least a part of which serves as a decorative design surface, and a non-decorative back surface, by subjecting a ligneous material wherein hydrogen bonds among fiber cells have been cut, to a flow molding process wherein the ligneous material is heated and pressed in a forming cavity, to apply shearing forces to the fiber cells to change relative positions of the fiber cells, for permitting flows of the ligneous material to fill the forming cavity, and the ligneous material filling the forming cavity is compressed and shaped, the method comprising: a step of providing, as the ligneous material, a surface-layer-portion ligneous material for forming a surface layer portion having the decorative design surface, and a base-layer-portion ligneous material for forming a base layer portion which is a remainder of the formed ligneous body other than the surface layer portion; a step of impregnating the fiber cells of the surface-layer-portion ligneous material with a first resin material, and curing the first resin material to form the surface layer portion; a step of impregnating the fiber cells of the base-layer-portion ligneous material with a second resin material; a step of accommodating, in the forming cavity, the surface layer portion formed of the surface-layer-portion ligneous material, and the base-layer-portion ligneous material which has been impregnated with the second resin material, such that the surface layer portion and the base-layer-portion ligneous material are superposed on each other; and a step of subjecting the base-layer-portion ligneous material accommodated in the forming cavity to the flow molding process such that the base-layer-portion ligneous material is compressed in a direction of mutual superposition of the surface layer portion and the base-layer-portion ligneous material, the second resin material contained in the base-layer-portion ligneous material being subsequently cured to form the base layer portion integrally with the surface layer portion accommodated in the forming cavity.

According to one preferred form of the invention, each of the first resin material and the second resin material is a thermosetting resin of the same kind, and the base-layer-portion ligneous material is subjected to the flow molding process in the forming cavity while the base-layer-portion ligneous material is heated at a curing point of the thermosetting resin, while the surface-layer-portion ligneous material is heated and cured in the forming cavity, at a temperature higher than the curing point of the thermosetting resin, whereby the surface layer portion is formed.

According to another preferred form of the invention, the first resin material is a thermosetting resin, while the second resin material is a thermosetting resin having a curing point higher than that of the first resin material, and the base-layer-portion ligneous material is subjected to the flow molding process in the forming cavity while the base-layer-portion ligneous material is heated at the curing point of the second resin material consisting of the thermosetting resin, while the surface-layer-portion ligneous material is heated and cured in the forming cavity, at the curing point of the second resin material consisting of the thermosetting resin, whereby the surface layer portion is formed.

According to a further preferred form of the invention, each of the first resin material and the second resin material is a thermoplastic resin of the same kind. In this form of the invention, the surface layer portion formed as a result of curing of the first resin material contained in the surface-layer-portion ligneous material is accommodated in the forming cavity, while the base-layer-portion ligneous material is subjected to the flow molding process in the forming cavity while the base-layer-portion ligneous material is heated at a temperature higher than a melting point of the thermoplastic resin, and the base-layer-portion ligneous material is then cooled to form the base layer portion. In this case, the surface layer portion accommodated in the forming cavity is preferably heated at a temperature lower than the melting point of the thermoplastic resin, while the base-layer-portion ligneous material is subjected to the flow molding process.

According to a still further preferred form of this invention, the first resin material is a thermoplastic resin while the second resin material is a thermoplastic resin having a melting point lower than that of the first resin material consisting of the thermoplastic resin. In this form of the invention, the surface layer portion formed as a result of curing of the first resin material is accommodated in the forming cavity, while the base-layer-portion ligneous material is subjected to the flow molding process in the forming cavity while the base-layer-portion ligneous material is heated at a temperature lower than the melting point of the first resin material consisting of the thermoplastic resin and higher than the melting point of the second resin material consisting of the thermoplastic resin, and the base-layer-portion ligneous material is then cooled to form the base layer portion. In this case, the surface layer portion accommodated in the forming cavity is preferably heated at the same temperature as the base-layer-portion ligneous material, while the base-layer-portion ligneous material is subjected to the flow molding process.

According to a yet further preferred form of the invention, an amount of the first resin material to be contained in a unit volume of the surface-layer-portion ligneous material is made smaller than that of the second resin material to be contained in the unit volume of the base-layer-portion ligneous material.

According to still another preferred form of the invention, the base-layer-portion ligneous material is subjected to the flow molding process, by using a forming mold which has the forming cavity and which is provided with deformation preventive portions configured to substantially prevent deformation of the surface-layer-portion ligneous material in the forming cavity, which deformation would be caused due to a pressing operation on the ligneous materials in the forming cavity and which would cause an enlargement of an area of the decorative design surface. The base layer portion is then formed as a result of curing of the second resin material contained in the base-layer-portion ligneous material.

According to a further preferred form of the present invention, the surface-layer-portion ligneous material takes the form of a sheet.

According to a still further preferred form of the invention, the base-layer-portion ligneous material takes the form of a laminar body consisting of a plurality of sheets superposed on each other in a direction of their thickness.

According to a yet further preferred form of the invention, one of the two adjacent sheets among the plurality of sheets of the laminar body superposed on the surface-layer-portion ligneous material or the surface layer portion accommodated within the forming cavity, which one sheet is more distant from the surface-layer-portion ligneous material or the surface layer portion than the other one of the two adjacent sheets, has a higher degree of fluidity in the flow molding process, than the other one of the two adjacent sheets, which is nearer to the surface-layer-portion ligneous material or the surface layer portion.

Namely, the formed ligneous body according to the first aspect of the present invention is configured such that the surface layer portion and the base layer portion are both formed in the flow molding process, so that the formed ligneous body has high degrees of scratch-, water- and weather-proof properties, and presents a genuine lumber feel. Further, the amount of change of the relative positions of the fiber cells of the surface layer portion caused in the flow molding process is smaller than the amount of change of the relative positions of the fiber cells of the base layer portion caused in the flow molding process. Accordingly, it is possible to effectively prevent or minimize a risk of deformation or collapse of a woody grain on the decorative design surface of the surface layer portion, which would be caused during formation of the surface layer portion in the flow molding process. Thus, the formed ligneous body advantageously has a natural and fine woody grain on the decorative design surface, and high degrees of aesthetic dignity and ligneous properties.

The formed ligneous body according to the second aspect of this invention is configured such that the fiber cells of the surface layer portion are impregnated with the first resin material in the cured state, while the fiber cells of the base layer portion are impregnated with the second resin material in the cured state, such that the amounts of the first and second resin materials contained in the surface layer portion and the base layer portion are sufficiently small, so that the formed ligneous body has high degrees of scratch-, water- and weather-proof properties, and presents a genuine lumber feel. The present formed ligneous body is further configured such that only the base layer portion is formed in the flow molding process, while the surface layer portion is not formed in the flow molding process, so that the decorative design surface of the surface layer portion does not suffer from deformation or collapse of its woody grain due to the flow molding process. Thus, the formed ligneous body advantageously has a natural and fine woody grain on the decorative design surface, and high degrees of aesthetic dignity and ligneous properties.

The method of producing the formed ligneous body according to the third aspect of the invention makes it possible to substantially prevent deformation and a consequent enlargement of the decorative design surface of the surface layer portion impregnated with the first resin material, which would be caused in the flow molding process performed on the base layer portion impregnated with the second resin material. Accordingly, the present method has substantially the same advantages and features as described above with respect to the formed ligneous bodies according to the first and second aspects of the invention.

According to the method of producing the formed ligneous body according to the fourth aspect of the invention, the surface layer portion whose fiber cells have been impregnated with the first resin material is not subjected to the flow molding process, and only the base layer portion whose fiber cells have been impregnated with the second resin material is subjected to the flow molding process. Accordingly, the present method has substantially the same advantages and features as descried above with respect to the formed ligneous body according to the second aspect of the invention.

BRIEF DESCRIPTION OF THE DRAWINGS

FIG. 3 are schematic views showing an example of a surface-layer-portion ligneous material used for production of the formed ligneous body of FIG. 1, FIG. 3(a) being a schematic cross sectional view while FIG. 3(b) being a schematic plan view;

FIG. 4 are schematic views showing an example of a base-layer-portion ligneous material used for production of the formed ligneous body of FIG. 1, FIG. 4(a) being a schematic cross sectional view while FIG. 4(b) being a schematic plan view;

FIG. 10 are schematic views showing another example of the base-layer-portion ligneous material used for production of the formed ligneous body of FIG. 1, FIG. 10(a) being a schematic cross sectional view while FIG. 10(b) being a schematic plan view;

DETAILED DESCRIPTION OF THE INVENTION

To further clarify the present invention, preferred embodiments of the invention will be described in detail by reference to the drawings.

Figure 1:
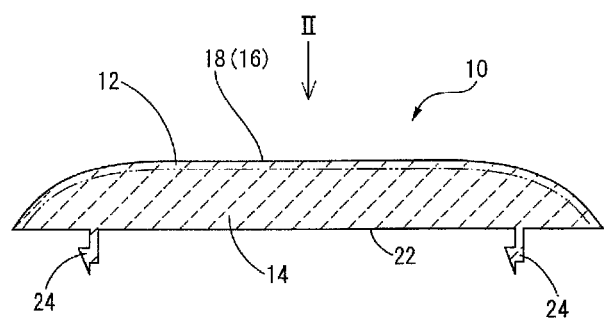
FIG. 1 is a schematic cross sectional view showing a formed ligneous body having a structure according to one embodiment of this invention.
Figure 2:
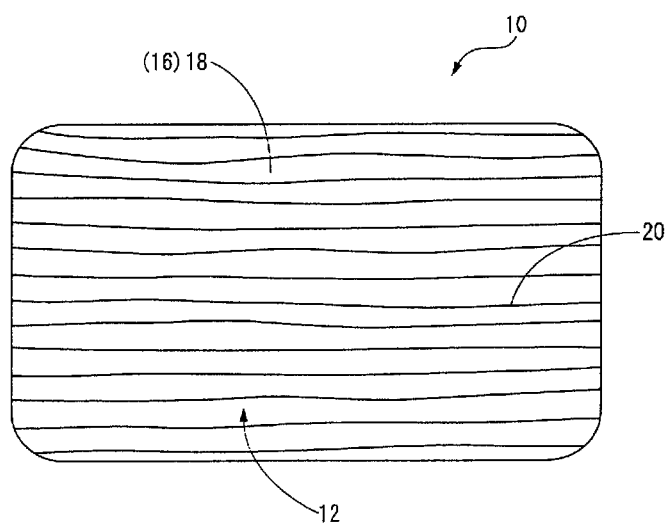
FIG. 2 is a view taken in a direction of an arrow II in FIG. 1.

Referring to the longitudinal cross sectional view of FIG. 1 and the plan view of FIG. 2, there is shown a formed ligneous body according to one embodiment of this invention, in the form of an automotive vehicle interior part 10. As is apparent from FIGS. 1 and 2, the automotive vehicle interior part 10 (hereinafter referred to simply as an "interior part 10") takes the form of a generally elongate rectangular plate having a relatively large thickness and consisting of a surface layer portion 12 and a base layer portion 14 which are formed integrally with each other.

Described more specifically, the surface layer portion 12 is a curved portion having a relatively small thickness and covering an entirety of an exposed surface 16 of the interior part 10. The entirety of the exposed surface 16 of this surface layer portion 12 serves as a decorative design surface 18. As shown in FIG. 2, the decorative design surface 18 has a natural and fine woody grain 20 in a straight or regular pattern (or a cross or irregular pattern). The surface layer portion 12 is formed from a walnut or any other high-grade lumber (timber) having a neat appearance.

On the other hand, the base layer portion 14 is a relatively thick portion which has an entire flat back surface 22 and which is the remainder of the interior part 10 other than the surface layer portion 12. In the present embodiment, the base layer portion 14 is formed from an agathis or any other lumber (timber) that is less costly than the ligneous material of the surface layer portion 12. The base layer portion 14 is provided with integrally formed fixing hooks 24 which project from the back surface 22 and which are formed from the same ligneous material with the base layer portion 14. Each of these fixing hooks 24 has a known structure consisting of a flexible plate-like support portion, and a jaw portion which is formed integrally with the support portion so as to extend from the distal end of the support portion. The fixing hooks 24 are provided to fix the interior part 10 to a predetermined part of an automotive vehicle, with a single pressing action.

In the interior part 10 according to the present embodiment, walls of fiber cells of the ligneous materials of the surface layer portion 12 and base layer portion 14 are impregnated with respective first and second resin materials in the form of thermosetting resin materials, such as phenolic resin materials, and the first and second resin materials are cured, so that the decorative design surface 18 of the surface layer portion 12 has sufficiently high degrees of scratch- or flaw-, water- and weather-proof properties, even in the absence of a coating layer in the form of a thin resin film covering the decorative design surface 18.

Further, the surface layer portion 12 and the base layer portion 14 of the interior part 10 are formed into desired shapes, by a flow molding process using two kinds of ligneous material impregnated with the phenolic resin. In particular, the surface layer portion 12 of the present interior part 10 is formed by the flow molding process, in a specific manner as described below, so as to prevent a substantial change of the relative positions of the fiber cells of the surface layer portion 12 in the process of the flow molding. Thus, the decorative design surface 18 of the surface layer portion 12 is given the natural woody grain 20. It is noted here that the phenolic resin may be replaced by melamine resins.

The interior part 10 having the structure described above is produced by the method which will be described.

Namely, a ligneous material 26 and a ligneous material 28 to form the respective surface layer portion 12 and base layer portion 14 of the desired interior part 10 are initially provided.

In the present embodiment, the surface-layer-portion ligneous material 26 takes the form of a relatively thin elongate rectangular flat sheet as shown in FIGS. 3(*a*) and 3(*b*), which is sliced from a walnut or other high-grade lumber, in a direction parallel to the direction of extension of the fibers. One of two major surfaces of this sheet of the surface-layer-portion ligneous material 26 which are opposed to each other in the thickness direction has a surface area smaller than the surface area of the decorative design surface 18 of the interior part 10, preferably, not less than 80% of the surface area of the decorative design surface 18. Namely, it is desirable that the surface area of the above-indicated major surface of the sheet of the surface-layer-portion ligneous material 26 is smaller than that of the decorative design surface 18 of the interior part 10 by a predetermined amount, but the former surface area may be equal to or larger than the latter surface area.

On the other hand, the base-layer-portion ligneous material 28 takes the form of a rectangular block as shown in FIGS. 4(*a*) and 4(*b*), which is sliced from a lumber less costly than the surface-layer-portion ligneous material 26, in a direction perpendicular to the direction of extension of the fibers. The block of this base-layer-portion ligneous material 28 has a height dimension that is larger than the thickness dimension of the thin sheet of the surface-layer-portion ligneous material 26, and one of two major surfaces of the block which are opposed to each other in the height direction has a surface area which is sufficiently smaller than the surface area of the back surface 22 of the interior part 10.

Figure 5:
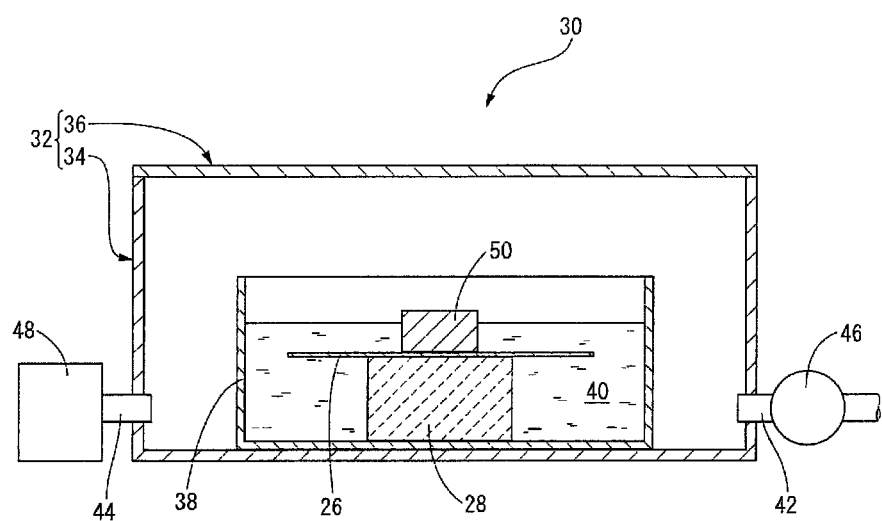
FIG. 5 is a schematic view showing an example of a step of a method of production of the formed ligneous body of FIG. 1, in which the surface-layer-portion ligneous material shown in FIG. 3 and the base-layer-portion ligneous material shown in FIG. 4 are impregnated with a resin material.

Then, the walls of the fiber cells of the surface-layer-portion ligneous material 26 and the base-layer-portion ligneous material 28, which fiber cells are principally composed of cellulose, are impregnated with the phenolic resin, by using a resin impregnating device 30 constructed as shown in FIG. 5.

As shown in FIG. 5, the resin impregnating device 30 has a pressure vessel 32, which includes a vessel body 34 open upwards, and a lid member 36 which is movable to open and close the upper opening of the vessel body 34 and which air-tightly closes the opening in its closed state. The vessel body 34 of the pressure vessel 32 houses an immersion bath 38 which accommodates a suitable amount of an aqueous solution 40 of the phenolic resin.

The vessel body 34 is provided with an exhaust pipe 42 and an intake pipe 44 such that these exhaust and intake pipes 42 and 44 are open to the interior space of the vessel body 34. The exhaust pipe 42 is provided with a vacuum pump 46, while the intake pipe 44 is connected to a compressor 48, so that the pressure vessel 32 is evacuated by operation of the vacuum pump 46, and is pressurized by operation of the compressor 48. The vacuum pump 46 and the compressor 48 are controlled by a controller not shown, to regulate the pressure within the pressure vessel 32.

To impregnate the surface-layer-portion ligneous material 26 and the base-layer-portion ligneous material 28 with the phenolic resin, by using the resin impregnating device 30 constructed as described above, the base-layer-portion ligneous material 28 and the surface-layer-portion ligneous material 26 are initially immersed in the aqueous phenolic resin solution 40 accommodated in the immersion bath 38 in the pressure vessel 32, such that the base-layer-portion ligneous material 28 and the surface-layer-portion ligneous material 26 are superposed on each other. Reference sign 50 in FIG. 5 represents a weight which is placed on the surface-layer-portion ligneous material 26 to prevent the base-layer-portion ligneous material 28 and the surface-layer-portion ligneous material 26 from flowing up to the level of the aqueous phenolic resin solution 40.

While the molecular weight of the phenolic resin in the aqueous phenolic resin solution 40 accommodated in the immersion bath 38 is not particularly limited, the average molecular weight of the phenolic resin is preferably small within a range of about 200-500, because the average molecular weight of the phenolic resin smaller than 200 is excessively small, giving rise to a risk of an insufficient effect of curing of the phenolic resin to maintain the shapes of the surface layer portion 12 and the base layer portion 14, while the average molecular weight of the phenolic resin larger than 500 is excessively large, giving rise to a risk of difficulty and an excessively small amount of impregnation of the walls of the fiber cells of the base-layer-portion ligneous material 28 and the surface-layer-portion ligneous material 26 with the phenolic resin, and a consequent insufficient effect of impregnation of the fiber cell walls of the base and surface-layer-portion ligneous materials 28 and 26 with the phenolic resin.

While the concentration of the aqueous phenolic resin solution 40 accommodated in the immersion bath 38 is not particularly limited, the concentration is preferably within a range of about 3-15%, because the concentration of the aqueous phenolic resin solution 40 less than 3% gives rise to insufficiency of the amount of impregnation of the fiber cell walls of the base-layer-portion ligneous material 28 and surface-layer-portion ligneous material 26 with the phenolic resin, and a consequent insufficient effect of impregnation of the fiber cell walls of the base-layer-potion and surface-layer-portion ligneous materials 28 and 26 with the phenolic resin, while the concentration of the aqueous phenolic resin solution 40 more than 15% gives rise to a risk of an excessively large amount of impregnation of the fiber cell walls of the base-layer-portion and surface-layer-portion ligneous materials 28 and 26 with the phenolic resin, and a consequent excessive amount of increase of the weight of the interior part 10 to be obtained as the end product.

After the base-layer-portion ligneous material 28 and the surface-layer-portion ligneous material 26 are immersed in the aqueous phenolic resin solution 40 in the immersion bath 38, the vessel body 34 of the pressure vessel 32 is air-tightly closed with the lid member 36, and the vacuum pump 46 is operated to evacuate the pressure vessel 32 to a pressure of about $2.03 \times 10^4$ Pa (0.2 atm). After the pressure within the pressure vessel 32 is held at this value for one minute, the vacuum pump 46 is turned off, and the pressure within the pressure vessel 32 is restored to the atmospheric pressure. Subsequently, the compressor 48 is operated to raise the pressure within the pressure vessel 32 to a value of about $7.09 \times 10^5$ Pa (7 atm), and the pressure within the pressure vessel 32 is held at this value for 60 minutes. The compressor 48 is then turned off, to restore the pressure within the pressure vessel 32 to the atmospheric pressure. Thus, the fiber cell walls of the base-layer-portion and surface-layer-portion ligneous materials 28 and 26 are impregnated with the aqueous phenolic resin solution 40.

As a result of impregnation of the fiber cell walls of the base-layer-portion and surface-layer-portion ligneous materials 28 and 26 with the aqueous phenolic resin solution 40 as described above, the molecules of the phenolic resin are adsorbed among the molecular chains of the fiber cells (cellulose) of the base-layer-portion and surface-layer-portion ligneous materials 28 and 26 which have been cross-linked with hydrogen bonds. Namely, the present embodiment is configured to implement a step of impregnating the fiber cell walls of the base-layer-portion and surface-layer-portion ligneous materials 28 and 26 with the aqueous phenolic resin solution 40, so as to concurrently cut the hydrogen bonds among the fiber cells of the base-layer-portion and surface-layer-portion ligneous materials 28 and 26.

Subsequently, the base-layer-portion and surface-layer-portion ligneous materials 28 and 26 are removed from the pressure vessel 32, and are left in the atmosphere, or subjected to a blow of hot air, so that the base-layer-portion and surface-layer-portion ligneous materials 28 and 26 are dried.

Figure 6:
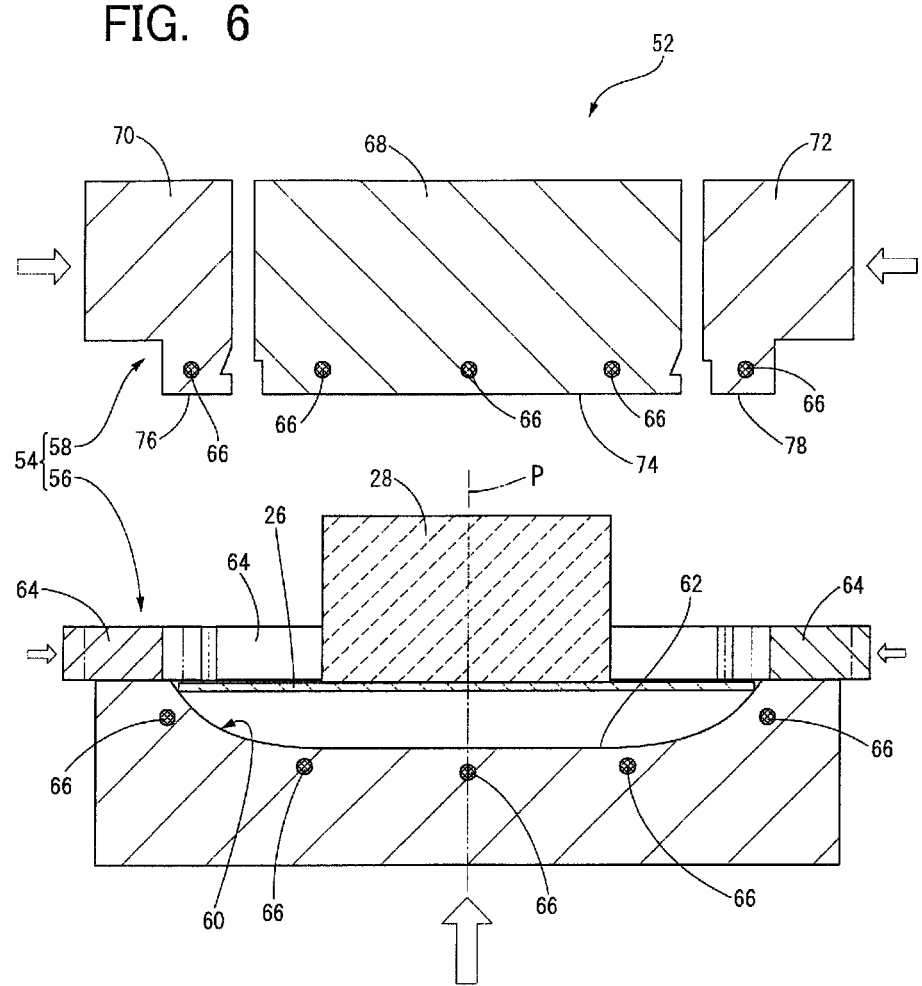
FIG. 6 is a schematic view showing an example of a step implemented following the step shown in FIG. 5, in which the surface-layer-portion ligneous material and the base-layer-portion ligneous material which have been impregnated with the resin material are set in a forming mold of a heating and pressing device.
Figure 7:
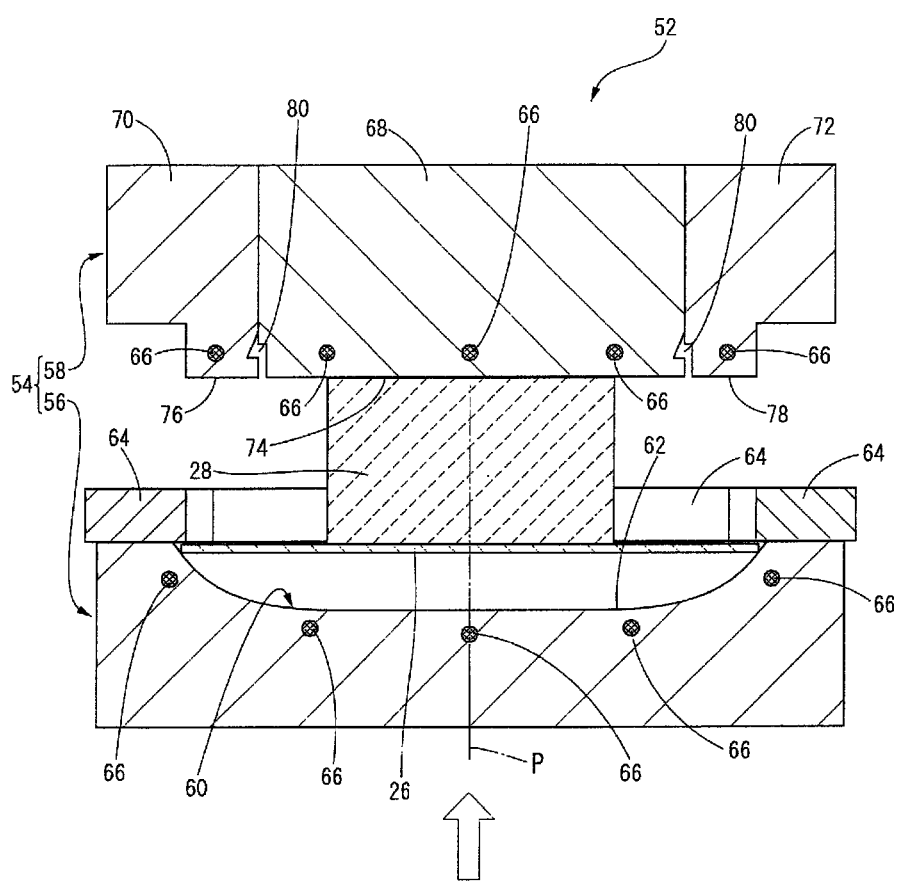
FIG. 7 is a schematic view showing an example of a step implemented following the step shown in FIG. 6, in which an upper die of the forming mold is brought into contact with an upper surface of the base-layer-portion ligneous material, in the process of a closing action of the forming mold.
Figure 8:
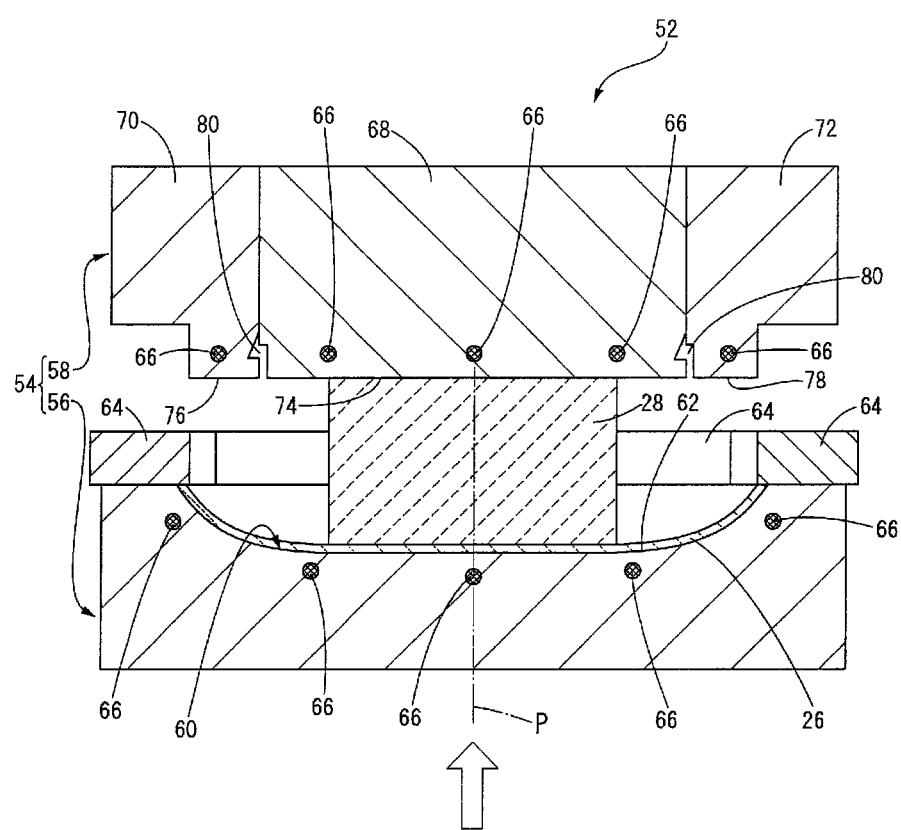
FIG. 8 is a schematic view showing an example of a step implemented following the step shown in FIG. 7, in which the surface-layer-portion ligneous material is pressed by the heating and pressing device into the surface layer portion, in the process of the closing action of the forming mold.

Then, the base-layer-portion and surface-layer-portion ligneous materials 28 and 26 are subjected to a flow molding process, by using a heating and pressing device 52, as shown in FIGS. 6-8.

As is apparent from FIGS. 6-8, the heating and pressing device 52 used in the present embodiment has a forming mold 54. This forming mold 54 includes a lower die 56, and an upper die 58 which is disposed above and in opposition to the lower die 56 with a predetermined distance therebetween.

The lower die 56 of the forming mold 54 is movable in the vertical direction by a predetermined distance, by a moving device which includes a hydraulic cylinder or the like and which has a structure known in the art. The lower die 56 has a recess 60 open in its upper surface. This recess 60 has a generally elongate rectangular shape, and is defined by a cavity surface 62 which is a downwardly curved elongate rectangular surface of the lower die 56, and which corresponds to the decorative design surface 18 of the surface layer portion 12 (of the interior part 10).

The lower die 56 has a plurality of cartridge heaters 66 embedded therein in the vicinity of the cavity surface 62. These cartridge heaters 66 are controlled of their heating temperature, by a controller not shown, so that the cavity surface 62 of the lower die 56 is heated to a predetermined temperature by the cartridge heaters 66 under the control of the controller.

On the upper surface of the lower die 56, there are disposed four deformation preventive portions 64 (three of which are shown in FIGS. 6-8). These four deformation preventive portions 64 are four divisions of a thick annular metal plate, which are arranged in the circumferential direction of the annular metal plate. The annular metal plate has an elongate rectangular center hole which is smaller than the opening of the recess 60. The deformation preventive portions 64 are positioned on the upper surface of the lower die 56, coaxially with the lower die 56 and slidably relative to the lower die 56, such that the deformation preventive portions 64 are positioned radially outwardly of the recess 60. The four deformation preventive portions 64 are connected to respective hydraulic cylinders (not shown) so that the deformation preventive portions 64 are moved in a horizontal plane in respective radial directions toward and away from a center axis P of the lower die 56.

Thus, the four deformation preventive portions 64 are movable toward the center axis P by advancing motions of pistons of the hydraulic cylinders, while at the same time the deformation preventive portions 64 are moved toward each other in the circumferential direction, with a result of abutting contact with each other in the circumferential direction, so that the deformation preventive portions 64 cooperate with each other to form a ring, such that the inner circumference of the ring is located at a predetermined advanced position which is spaced radially inwardly with respect to the periphery of the opening of the recess 60, by a predetermined distance, as indicated by two-dot chain lines in FIG. 6. This distance from the periphery of the opening of the recess 60 to the advanced position of the inner circumference of the ring constituted by the four deformation preventive portions 64 as a result of the advancing piston motions of the hydraulic cylinders is determined to be almost equal to the thickness dimension of the surface-layer-portion ligneous material 26.

The four deformation preventive portions 64 are movable away from the center axis P by retracting motions of the pistons of the hydraulic cylinders, while at the same time the deformation preventive portions 64 are moved away from each other in the circumferential direction, to a predetermined retracted position which is spaced apart from the periphery of the opening of the recess 60 outwardly of the opening, as indicated by solid lines in FIG. 6. That is, the four deformation preventive portions 64 are slidably movable on the upper surface of the lower die 56 in the horizontal plane, between the above-indicated advanced and retracted positions, by the advancing and retracting piston motions of the respective hydraulic cylinders.

On the other hand, the upper die 58 includes: a first split-die member 68 which is opposed to a central part of the upper surface of the lower die 56 (a central part of the cavity surface 62), with a predetermined spacing distance therebetween; and a second split-die member 70 and a third split-die member 72 which are disposed on respective left and right sides of the first split-die member 68 (as seen in FIG. 6), namely, on the longitudinally opposite sides of the recess 60, such that the first split-die member 68 is interposed between the second and third split-die members 70, 72, and such that the second and third split-die members 70, 72 are opposed to the first split-die member 68 in the longitudinal direction of the recess 60.

The first split-die member 68 of the upper die 58 is fixed in position, and has a flat lower surface, which functions as a first pressure surface 74. The first split-die member 68 has a plurality of cartridge heaters 66 embedded therein in the vicinity of the first pressure surface 74. Like the cartridge heaters 66 embedded in the lower die 56, the cartridge heaters 66 of the first split-die member 68 are controlled of their heating temperature, by the controller not shown, so that the first pressure surface 74 is heated to a predetermined temperature by the cartridge heaters 66 under the control of the controller.

The second split-die member 70 is movable toward and away from the first split-die member 68, by a hydraulic cylinder or any other known moving device not shown. A movement of the second split-die member 70 toward the first split-die member 68 causes abutting contact of the first and second split-die members 68, 70 with each other on their mutually opposed surfaces.

The second split-die member 70 has a flat lower surface which functions as a second pressure surface 76. When the second split-die member 70 and the first split-die member 68 are held in abutting contact with each other, as shown in FIG. 7, these split-die members 70, 68 cooperate to define a fixing-hook forming cavity 80 between their mutually abutting surfaces. This fixing-hook forming cavity 80 is open downwards, and is provided to form the above-indicated fixing hook 24 integrally with the back surface 22 of the base layer portion 14 (of the interior part 10).

The second split-die member 70 has cartridge heaters 66 embedded therein in the vicinity of the second pressure surface 76. Like the cartridge heaters 66 embedded in the lower die 56 and the first split-die member 68, the cartridge heaters 66 of the second split-die member 70 are controlled of their heating temperature, by the controller not shown, so that the second pressure surface 76 is heated to a predetermined temperature by the cartridge heaters 66 under the control of the controller.

The third split-die member 72 has the same construction as the second split-die member 70. Namely, the third split-die member 72 is movable toward and away from the first split-die member 68, and has a lower surface functioning as a third pressure surface 78. When the third split-die member 72 and the first split-die member 68 are held in abutting contact with each other, as shown in FIG. 7, these split-die members 72, 68 cooperate to define another fixing-hook forming cavity 80 between their mutually abutting surfaces. This fixing-hook forming cavity 80 is open downwards. Further, the third pressure surface 78 is heated to a predetermined temperature by the cartridge heaters 66 embedded in the third split-die member 72.

Figure 9:
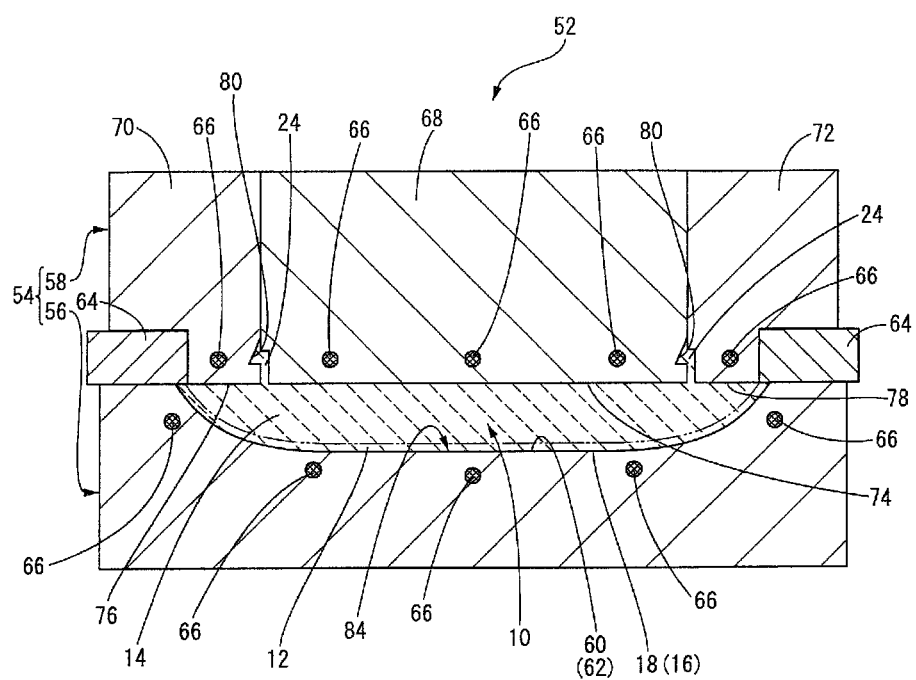
FIG. 9 is a schematic view showing an example of a step implemented following the step shown in FIG. 8, in which the base-layer-portion ligneous material is subjected to a flow molding process by the heating and pressing device, to form the base layer portion at the end of the closing action of the forming mold.

In the forming mold 54 constructed as described above, the upper die 58 is formed by the three split-die members 68, 70 and 72 held in abutting contact with each other as a result of the movements of the second and third split-die members 70 and 72 toward the first split-die member 68. The upper die 58 and the lower die 56 are closed by an upward movement of the lower die 56 toward the upper die 58. During this upward movement of the lower die 56, the four deformation preventive portions 64 are moved toward each other, so that the inner circumference of the ring constituted by the deformation preventive portions 64 is spaced radially inwardly with respect to the periphery of the opening of the recess 60. As a result, the recess 60 of the lower die 56 is covered by the first, second and third pressure surfaces 74, 76 and 78 of the first, second and third split-die members 68, 70 and 72 of the upper die 58, and the lower surfaces of the deformation preventive portions 64, so that a forming cavity 84 having a shape corresponding to that of the desired interior part 10 is defined by the cavity surface 62 of the recess 60, the first, second and third pressure surfaces 74, 76 and 78 and the lower surfaces of the four deformation preventive portions 64. This forming cavity 84 is held in communication with the fixing-hook forming cavities 80, 80 formed between the first split-die member 68 and the second and third split-die members 70 and 72, as shown in FIG. 9.

To perform a flow molding with respect to the surface-layer-portion ligneous material 26 and the base-layer-portion ligneous material 28, by using the heating and pressing device 52 having the thus constructed forming mold 54, the surface-layer-portion ligneous material 26 is initially accommodated in the recess 60 of the lower die 56, and the base-layer-portion ligneous material 28 is placed on the surface-layer-portion ligneous material 26, while the upper die 58 and the lower die 56 are vertically spaced apart from each other, with the four deformation preventive portions 64 being located at the above-indicated retracted position, as shown in FIG. 6.

The surface-layer-portion ligneous material 26 is accommodated in the recess 60 such that the surface-layer-portion ligneous material 26 is held in a substantially horizontally extending posture, and the periphery of the surface-layer-portion ligneous material 26 is held in engagement with the peripheral portion of the cavity surface 62 in the vicinity of the opening of the recess 60, so that the opening of the recess 60 is covered by the surface-layer-portion ligneous material 26. The base-layer-portion ligneous material 28 is placed in a central part of the upper surface of the surface-layer-portion ligneous material 26.

After or before the surface-layer-portion ligneous material 26 and the base-layer-portion ligneous material 28 are positioned with respect to the recess 60 as described above, the cavity surface 62 of the lower die 56 is heated by the plurality of cartridge heaters 66 embedded in the lower die 56, to a temperature higher than the curing point of the phenolic resin contained in the aqueous phenolic resin solution 40 used to impregnate the walls of the fiber cells of the surface-layer-portion ligneous material 26 and the base-layer-portion ligneous material 28, and the cavity surface 62 is kept at this temperature. At the same time, the first, second and third pressure surfaces 74, 76 and 78 of the first, second and third split-die members 68, 70 and 72 are heated by the cartridge heaters 66 embedded in the split-die members 68, 70 and 72, to the curing point of the phenolic resin, and the pressure surfaces 74, 76 and 78 are kept at this temperature. Described more specifically, the cavity surface 62 is heated to and kept at a temperature of about 180° C., while the first, second and third pressure surfaces 74, 76 and 78 are heated to and kept at a temperature of about 150° C. Although the optimum heating temperatures of the cavity surface 62 and the first, second and third pressure surfaces 74, 76 and 78 are influenced by the curing and fusing points of the resin material used to impregnate the ligneous materials 26 and 28, the optimum temperatures are generally selected within a range of about 100-200° C.

Then, the four deformation preventive portions 64 are moved to the above-indicated advanced position for abutting contact with each other in the circumferential direction, so that the inner circumference of the ring constituted by the four deformation preventive portions 64 is spaced radially inwardly with respect to the periphery of the opening of the recess 60, as indicated in FIG. 7. At the same time, the second and third split-die members 70 and 72 are moved into abutting contact with the first split-die member 68, so that these three split-die members 68, 70 and 72 cooperate to form the upper die 58. Then, the lower die 56 is moved upwards.

During the above-described movements after the surface-layer-portion ligneous material 26 is accommodated in the recess 60 and the base-layer-portion ligneous material 28 is placed on the surface-layer-portion ligneous material 26, the surface-layer-portion ligneous material 26 opposed to and located in the vicinity of the cavity surface 62 is heated by the cavity surface 62 heated by the cartridge heaters 66, so that the surface-layer-portion ligneous material 26 as a whole is softened, and the phenolic resin with which the walls of the fiber cells of the surface-layer-portion ligneous material 26 and the base-layer-portion ligneous material 28 have been impregnated is once softened before the temperature of the phenolic resin reaches the curing point. Further, the upward movement of the lower die 56 causes the upper surface of the base-layer-portion ligneous material 28 to be brought into pressing contact with the first pressure surface 74 of the first split-die member 68 of the upper die 58, so that the base-layer-portion ligneous material 28 is heated by the first pressure surface 74 heated by the cartridge heaters 66.

As shown in FIG. 8, the lower die 56 is further moved upwards from the position of FIG. 7, so that the surface-layer-portion ligneous material 26 and the base-layer-portion ligneous material 28 are pressed or compressed by the first, second and third pressure surfaces 74, 76 and 78 in the direction of mutual superposition of those ligneous materials 26 and 28.

Since the entirety of the surface-layer-portion ligneous material 26 and the phenolic resin contained in the surface-layer-portion ligneous material 26 have already been softened, the surface-layer-portion ligneous material 26 is pressed onto the cavity surface 62 by the upper die 58 via the base-layer-portion ligneous material 28, and is thereby shaped so as to follow the shape of the cavity surface 26. The thus shaped surface-layer-portion ligneous material 26, whose one major surface is entirely held in contact with the cavity surface 62 heated to the temperature higher than the curing point of the phenolic resin, is rapidly heated to the curing point, so that the phenolic resin contained in the surface-layer-portion ligneous material 26 is cured. Thus, the surface-layer-portion ligneous material 26 is given the permanent shape corresponding to that of the cavity surface 62, whereby the surface layer portion 12 is formed such that the surface of the surface layer portion 12 in contact with the cavity surface 62 serves as the decorative design surface 18.

It is noted that the hydrogen bonds among the fiber cells of the surface-layer-portion ligneous material 26 are cut as a result of impregnation of the walls of the fiber cells with the aqueous phenolic resin solution 40, so that the surface-layer-portion ligneous material 26 is subjected to a flow molding process during the above-described heating and pressing operations performed on the surface-layer-portion ligneous material 26, until the phenolic resin contained in the surface-layer-portion ligneous material 26 has been completely cured. Namely, shearing forces act on the fiber cells during the heating and pressing operations on the surface-layer-portion ligneous material 26, until the cross linking of the phenolic resin is completed, so that the relative positions of the fiber cells are changed, and the surface-layer-portion ligneous material 26 flows along the cavity surface 62, with a result of an enlargement of the decorative design surface 18.

However, the surface-layer-portion ligneous material 26 is subjected to the above-described flow molding process while the inner circumference of the ring constituted by the four deformation preventive portions 64 is positioned at the above-indicated advanced position located radially inwardly with respect to the periphery of the opening of the recess 60. Accordingly, the surface-layer-portion ligneous material 26 flowing along the cavity surface 62 comes into contact with the inner portions of the deformation preventive portions 64, making it possible to effectively prevent ejection or extrusion of the surface-layer-portion ligneous material 26 out of the recess 60. Further, the surface-layer-portion ligneous material 26 is formed from a thin rectangular flat sheet sliced from a lumber in a direction parallel to the direction of extension of the fibers, so that the amount of flow of the surface-layer-portion ligneous material 26 can be effectively reduced in the direction parallel to the direction of extension of the fibers.

Thus, the amount of deformation of the surface-layer-portion ligneous material 26 in the flow molding process is suitably limited to prevent the surface area of the decorative design surface 18 from exceeding a nominal value of the surface area of the decorative design surface 18 of the end product in the form of the interior part 10. In the present embodiment, therefore, it is possible to effectively prevent an excessively large amount of deformation of the surface-layer-portion ligneous material 26, and consequent deformation or collapse of the woody grain of the surface-layer-portion ligneous material 26 which gives the decorative design surface 18 of the interior part 10.

Subsequently, the lower die 56 is further moved upwards to a position at which the forming cavity 84 is formed between the lower die 56 and the upper die 58, as shown in FIG. 9. As a result, the base-layer-portion ligneous material 28 is principally pressed with a force of about 200 t, between the first, second and third pressure surfaces 74, 76 and 78 of the upper die 58 (first, second and third split-die members 68, 70 and 72) and the cavity surface 62 of the lower die 56, via the surface-layer-portion ligneous material 26, in the direction of mutual superposition of those ligneous materials 26 and 28. The base-layer-portion ligneous material 28 being thus pressed is heated by the first, second and third pressure surfaces 74, 76 and 78 heated by the cartridge heaters 66, and is subjected to the flow molding process during the above-indicated heating and pressing operations.

That is, the heating and pressing operations are performed on the base-layer-portion ligneous material 28 which has been impregnated with the aqueous phenolic resin solution 40 to cut the hydrogen bonds, so that shearing forces act on the fiber cells of the base-layer-portion ligneous material 28, and the relative positions of the fiber cells are changed. As a result, the base-layer-portion ligneous material 28 flows within the forming cavity 84 formed between the upper die 58 and the lower die 56, so that the forming cavity 84 and the fixing-hook forming cavities 80, 80 are filled with the base-layer-portion ligneous material 28. It is noted that the base-layer-portion ligneous material 28 is generally pressed in the flow molding process, with a force sufficient to permit the base-layer-portion ligneous material 28 to have a specific gravity of not less than 1.3.

Unlike the flow molding process performed on the surface-layer-portion ligneous material 26, the flow molding process is performed on the base-layer-portion ligneous material 28, without limitation of flow of the ligneous material 28 by the deformation preventive portions 64. Further, the base-layer-portion ligneous material 28 is a rectangular block sliced from a lumber in the direction perpendicular to the direction of extension of the fibers, so that the base-layer-portion ligneous material 28 flows in the direction perpendicular to the direction of extension of the fibers. In the present embodiment, therefore, the base-layer-portion ligneous material 28 can flow more smoothly and by a larger amount, than in the case where the base-layer-portion ligneous material is sliced from a lumber in the direction parallel to the direction of extension of the fibers.

Accordingly, the base-layer-portion ligneous material 28 more freely flows within the forming cavity 84 in the flow molding process, so that the amount of flow of the base-layer-portion ligneous material 28 in the flow molding process is larger than the amount of flow of the surface-layer-portion ligneous material 26, so that the amount of change of the relative positions of the fiber cells of the base-layer-portion ligneous material 28 due to the flow molding is made sufficiently larger than the amount of change of the relative positions of the fiber cells of the surface-layer-portion ligneous material 26 due to the flow molding. It will be understood from the foregoing description that the surface layer portion 12 of the interior part 10 according to the present embodiment is formed of a portion of the ligneous material flowing in the flow molding process, which portion has a smallest amount of flow and gives the decorative design surface 18.

The base-layer-portion ligneous material 28 filling the forming cavity 84 and the fixing-hook forming cavities 80 is kept subjected to the pressing force, so that the base-layer-portion ligneous material 28 is compacted. The thus compacted base-layer-portion ligneous material 28 is heated by the first, second, and third pressure surfaces 74, 76 and 78 and the cavity surface 62, to the curing point of the phenolic resin. In this respect, it is noted that the base-layer-portion ligneous material 28 and the surface-layer-portion ligneous material 26 are kept pressed by the upper die 58 and the lower die 56, for about 60 seconds, for example.

Thus, the base-layer-portion ligneous material 28 is given (formed to have) a permanent shape corresponding to a portion of the forming cavity 84 other than the portion in which the surface layer portion 12 is formed, whereby the base layer portion 14 is eventually formed. At the same time, the fixing hooks 24, 24 are formed integrally with the base layer portion 14 such that the fixing hooks 24, 24 extend from the back surface 22. Further, the surface layer portion 12 and the base layer portion 14 are formed integrally with each other in the forming cavity 84, to obtain the interior part 10. It is considered that the surface layer portion 12 and the base layer portion 14 are integrated into a one-piece body, owing to the bonding of the phenolic resin contained in the surface layer portion 12 (surface-layer-portion ligneous material 26) and the phenolic resin contained in the base layer portion 14 (base-layer-portion ligneous material 28) to each other, or in the presence of lignin existing among the fiber cells of the surface layer portion 12 (surface-layer-portion ligneous material 26) and the base layer portion 14 (base-layer-portion ligneous material 28).

Then, the upper die 58 and the lower die 56 are spaced apart from each other, and the one-piece body consisting of the surface layer portion 12 and the base layer portion 14 is removed from the upper die 58 and the lower die 56. Thus, the interior part 10 having the structure shown in FIG. 1 is produced.

It will be understood from the foregoing description that the surface layer portion 12 and the base layer portion 14 of the interior part 10 according to the present embodiment are formed as a result of curing of the phenolic resin with which the fiber cells are impregnated. Therefore, the interior part 10 is advantageously given higher degrees of scratch-, water- and weather-proof properties, without having to coat the exposed surface 16 and the back surface 22 of the interior part 10 with a coating layer formed of a transparent resin. In addition, the interior part 10 is advantageously protected from its geometrical deformation due to its soaking with an aqueous component. Further, in the absence of any coating layer of a resin material covering the exposed surface 16 and the back surface 22, the interior part 10 is effectively given a genuine lumber appearance and feel. Furthermore, the interior part 10 using the phenolic resin in an amount as small as possible does not cause deterioration of preservation of resources and environments.

In addition, according to the present interior part 10 consisting of the surface layer portion 12 and the base layer portion 14 which are both formed by the flow molding process, the amount of change of the relative positions of the fiber cells of the surface layer portion 12 during its flow molding is made sufficiently smaller than the amount of change of the relative positions of the fiber cells of the base layer portion 14 during its flow molding. Therefore, it is possible to minimize the amount of deformation of the decorative design surface 18 of the surface layer portion 12 during its flow molding, and to effectively prevent or minimize the deformation or collapse of the grain of the decorative design surface 18 during the flow molding of the surface layer portion 12. Accordingly, the present interior part 10 can be given the decorative design surface 18 having a natural and fine woody grain, and advantageously present significantly enhanced aesthetic dignity and ligneous property.

The present embodiment uses a high-grade walnut as the surface-layer-portion ligneous material 26 for forming the surface layer portion 12 having the decorative design surface 18, but uses an agathis lumber less costly than the walnut, as the base-layer-portion ligneous material 28. Accordingly, it is possible to effectively reduce the overall material cost of the interior part 10, while assuring a high-grade appearance of the decorative design surface 18.

Further, the method of producing a formed ligneous body permits industrially advantageous production of the interior part 10 having the above-described excellent properties, by subjecting the surface-layer-portion ligneous material 26 and the base-layer-portion ligneous material 28 to a commonly performed heating and pressing operations which is performed by using the heating and pressing device 52, by simply locating the four deformation preventive portions 64 at the advanced position, and regulating the temperature of the first, second and third pressure surfaces 74, 76 and 78 heated by the cartridge heaters 66 embedded in the upper die 58, and the temperature of the cavity surface 62 heated by the cartridge heaters 66 embedded in the lower die 56, to different temperature values under the control of the controller.

By the way, the interior part 10 having the structure shown in FIG. 1 may be produced by an alternative method different from the method described above. This alternative method will be described.

Initially, the surface-layer-portion ligneous material 26 having the structure shown in FIG. 3 is provided.

Further, there are provided a plurality of base-layer-portion ligneous materials 86 each in the form of an elongate rectangular flat sheet which is sliced from a lumber less costly than the surface-layer-portion ligneous material 26, in the direction perpendicular to the direction of extension of the fibers, as shown in FIGS. 10(a) and 10(b). Each of these base-layer-portion ligneous materials 86 has a thickness larger than that of the surface-layer-portion ligneous material 26, and one of two major surfaces of the base-layer-portion ligneous material 86 which are opposed to each other in the thickness direction has a smaller area than that of the surface-layer-portion ligneous material 26. In this embodiment, three base-layer-portion ligneous materials 86 are provided.

Figure 11:
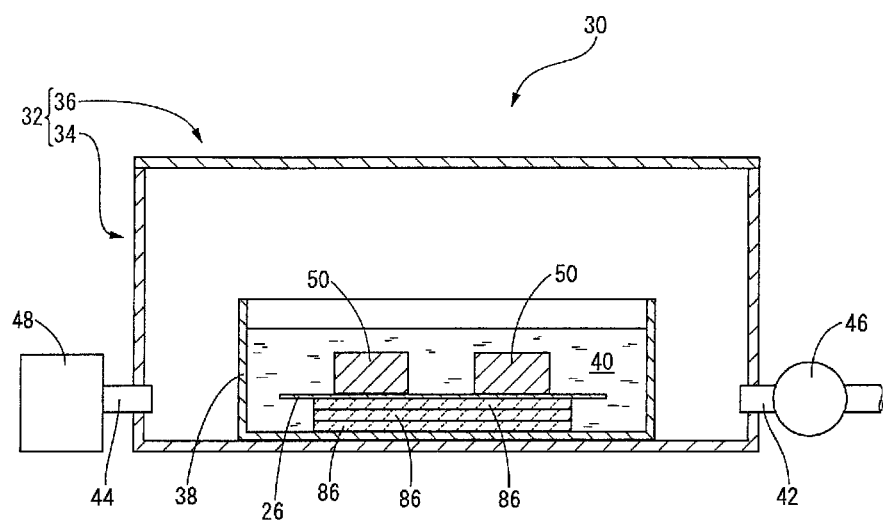
FIG. 11 is a schematic view showing an example of a step of a method of production of the formed ligneous body by using the surface-layer-portion ligneous material shown in FIG. 3 and the base-layer-portion ligneous material shown in FIG. 10, in which the surface-layer-portion ligneous material and the base-layer-portion ligneous material are impregnated with a resin material.

Then, the walls of the fiber cells of the surface-layer-portion ligneous material 26 and the base-layer-portion ligneous materials 86 are impregnated with the aqueous phenolic resin solution 40, by using the resin impregnating device 30, as shown in FIG. 11. The same reference signs as used in FIG. 5 will be used in FIG. 11 to identify the elements and portions of the resin impregnating device 30, which will not be described redundantly.

The step of impregnating the surface-layer-portion ligneous material 26 and the base-layer-portion ligneous materials 86 with the aqueous phenolic resin solution 40 by using the resin impregnating device 30 in this embodiment is identical with the above-described step of impregnating the surface-layer-portion ligneous material 26 and the base-layer-portion ligneous material 28. Namely, the surface-layer-portion ligneous material 26 and the plurality of base-layer-portion ligneous materials 86 are immersed in the aqueous phenolic resin solution 40 in the immersion bath 38 disposed within the pressure vessel 32 of the resin impregnating device 30, and the pressure within the pressure vessel 32 is initially reduced and then raised to the pressure values described above with respect to the preceding embodiment.

Each of the base-layer-portion ligneous materials 86 takes the form of a flat sheet having a larger thickness than the surface-layer-portion ligneous material 26, so that each base-layer-portion ligneous material 86 can be impregnated with the aqueous phenolic resin solution 40, more sufficiently even in its central part in the direction of its thickness or height, than in the case where the base-layer-portion ligneous material 86 would take the form of a rectangular block having a height larger than the thickness of the above-indicated flat sheet.

After the impregnating step, the surface-layer-portion ligneous material 26 and the base-layer-portion ligneous materials 86 are removed from the pressure vessel 32, and are dried.

Subsequently, the surface-layer-portion ligneous material 26 is subjected to heating and pressing operations by using a surface-layer-portion forming heating and pressing device 88 shown in FIGS. 12 and 13, to form the surface layer portion 12.

Figure 12:
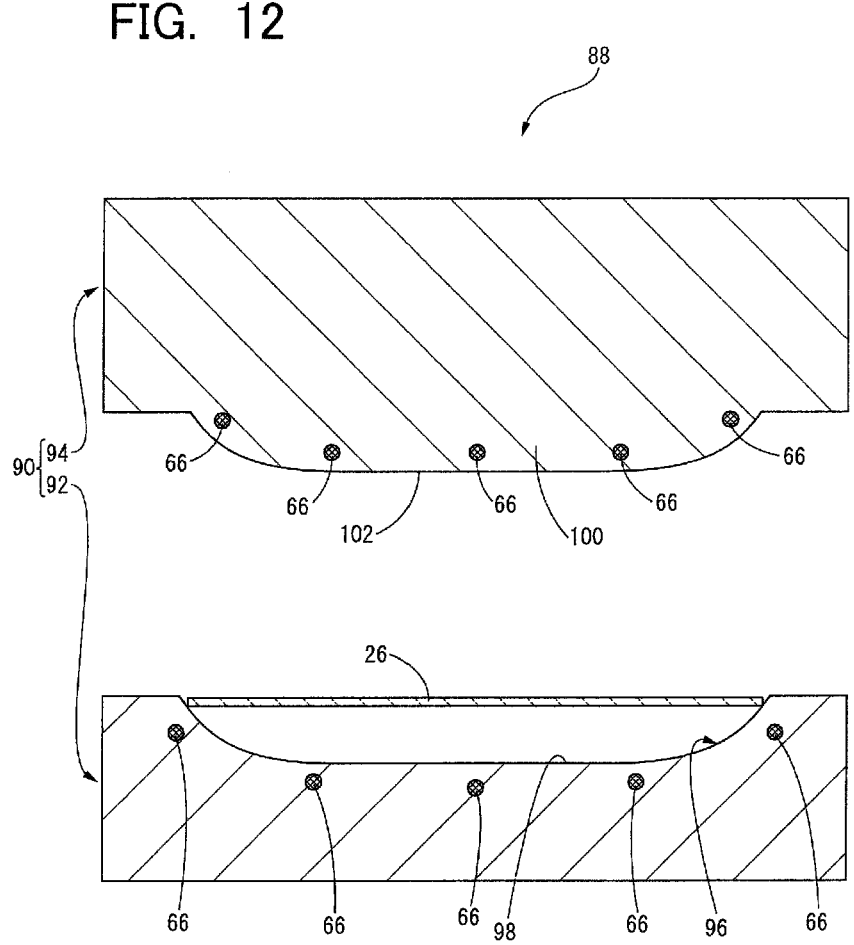
FIG. 12 is a schematic view showing an example of a step implemented following the step shown in FIG. 11, in which the surface-layer-portion ligneous material is set in a surface-layer-portion forming mold of a surface-layer-portion forming heating and pressing device.

Namely, the surface-layer-portion forming heating and pressing device 88 has a surface-layer-portion forming mold 90, which includes a lower die 92 fixed in position, and an upper die 94 which is disposed above and in opposition to the lower die 92 with a predetermined distance therebetween, as shown in FIG. 12.

The lower die 92 of the surface-layer-portion forming mold 90 has a cavity forming recess 96 open upwards. This cavity forming recess 96 has a substantially elongate rectangular shape, and a lower-die cavity surface 98 in the form of a downwardly curved elongate rectangular surface corresponding to the decorative design surface 18 of the surface layer portion 12 (of the interior part 10).

Further, the lower die 92 has a plurality of cartridge heaters 66 embedded therein in the vicinity of the lower-die cavity surface 98. These cartridge heaters 66 are controlled of their heating temperature by a controller not shown, so that the lower-die cavity surface 98 is heated to a predetermined temperature by the cartridge heaters 66 the temperature of which is controlled by the controller.

On the other hand, the upper die 94 is vertically movable by a predetermined distance by a moving device which includes a hydraulic cylinder or the like and which has a structure known in the art. Further, the upper die 94 has an integrally formed cavity forming protrusion 100 protruding downwards from its lower surface, and this cavity forming protrusion 100 has an upper-die cavity surface 102 in the form of a downwardly curved surface corresponding to the surface of the surface layer portion 12 opposite to the decorative design surface 18, that is, corresponding to the surface of the surface layer portion 12 bonded to the base layer portion 14.

The upper die 94 has a plurality of cartridge heaters 66 embedded therein in the vicinity of the upper-die cavity surface 102. Like the plurality of cartridge heaters 66 embedded in the lower die 92, the cartridge heaters 66 embedded in the upper die 94 are controlled of their heating temperature by the controller not shown, so that the upper-die cavity surface 102 is heated to a predetermined temperature by the cartridge heaters 66 the temperature of which is controlled by the controller.

Figure 13:
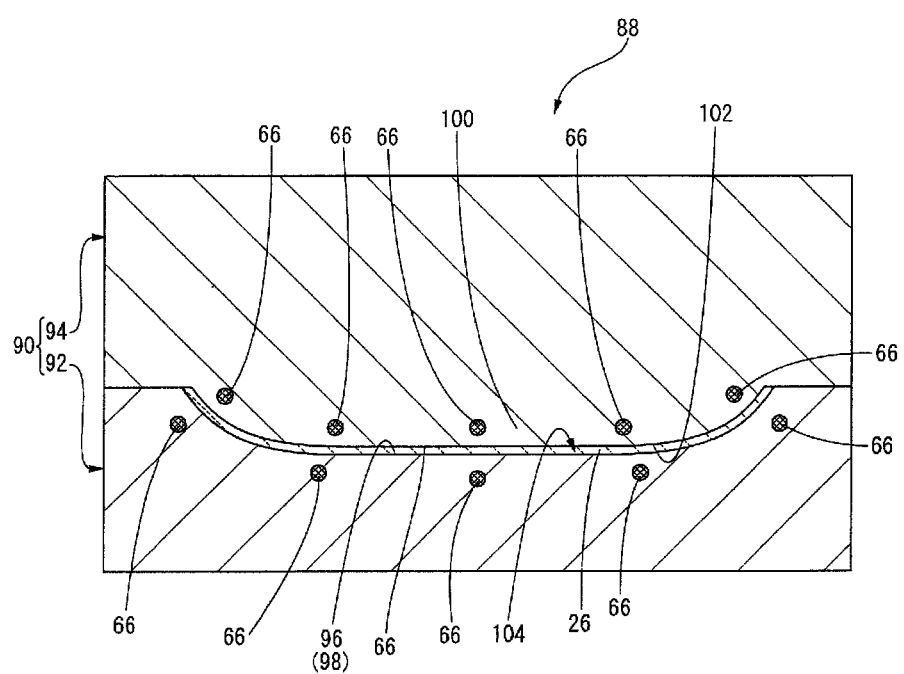
FIG. 13 is a schematic view showing an example of a step implemented following the step shown in FIG. 12, in which the surface-layer-portion ligneous material is pressed by the heating and pressing device into the surface layer portion, in the process of a closing action of the surface-layer-portion forming mold.

The surface-layer-portion forming mold 90 is closed by a downward movement of the upper die 94 toward the lower die 92, with the cavity forming protrusion 100 of the upper die 94 being fitted in the cavity forming recess 96 of the lower die 92, as shown in FIG. 13, such that a forming cavity 104 having a shape corresponding to that of the surface layer portion 12 is formed between the lower die 92 and the upper die 94, namely, defined by the lower-die cavity surface 98 and the upper-die cavity surface 102.

To form the surface layer portion 12 by using the surface-layer-portion forming heating and pressing device 88 having the surface-layer-portion forming mold 90 constructed as described above, the surface-layer-portion ligneous material 26 the fiber cell walls of which have been impregnated with the aqueous phenolic resin solution 40 is initially accommodated in the cavity forming recess 96 of the lower die 92 while the surface-layer-portion forming mold 90 consisting of the lower die 92 and the upper die 94 is held in its open state, as shown in FIG. 12. At this time, the surface-layer-portion ligneous material 26 is disposed in the cavity forming recess 96 such that the periphery of the surface-layer-portion ligneous material 26 is held in engagement with the peripheral portion of the lower-die cavity surface 98 in the vicinity of the opening of the cavity forming recess 96, so that the opening of the cavity forming recess 96 is covered by the surface-layer-portion ligneous material 26.

While or before the surface-layer-portion ligneous material 26 is accommodated in the cavity forming recess 96, the lower-die cavity surface 98 of the lower die 92 and the upper-die cavity surface 102 of the upper die 94 are heated by the plurality of cartridge heaters 66 embedded in the lower die 92 and the upper die 94, to a softening point of the phenolic resin contained in the aqueous phenolic resin solution 40 with which the surface-layer-portion ligneous material 26 has been impregnated. The lower-die cavity surface 98 and the upper-die cavity surface 102 are then kept at the softening point. Accordingly, the surface-layer-portion ligneous material 26 accommodated in the cavity forming recess 96 is heated by the heated lower-die cavity surface 98 and upper-die cavity surface 102, so that the surface-layer-portion ligneous material 26 is softened as a whole, while at the same time the phenolic resin contained in the aqueous phenolic resin solution 40 in the surface-layer-portion ligneous material 26 is softened at its softening point lower than the curing point. In the present embodiment, the lower-die cavity surface 98 and the upper-die cavity surface 102 are heated to a temperature of about 150° C., or a temperature slightly lower than 150° C.

Then, the upper die 94 is moved downwards until the cavity forming protrusion 100 is fitted in the cavity forming recess 96 of the lower die 92, as shown in FIG. 13, so that the forming cavity 104 thus formed between the lower die 92 and the upper die 94 is filled with the surface-layer-portion ligneous material 26 accommodated in the cavity forming recess 96. As a result, the surface-layer-portion ligneous material 26 is subjected to heating and pressing operations, so that the surface-layer-portion ligneous material 26 is given the shape corresponding to that of the forming cavity 104. Then, the surface-layer-portion ligneous material 26 is heated by the lower-die cavity surface 98 and the upper-die cavity surface 102 to the curing point (e.g., about 150° C.) of the phenolic resin, so that the phenolic resin contained in the surface-layer-portion ligneous material 26 is cured to permit the surface-layer-portion ligneous material 26 to maintain the shape corresponding to that of the forming cavity 104, whereby the surface layer portion 12 is formed such that the surface of the surface layer portion 12 on the side of the lower-die cavity surface 98 serves as the decorative design surface 18.

Figure 14:
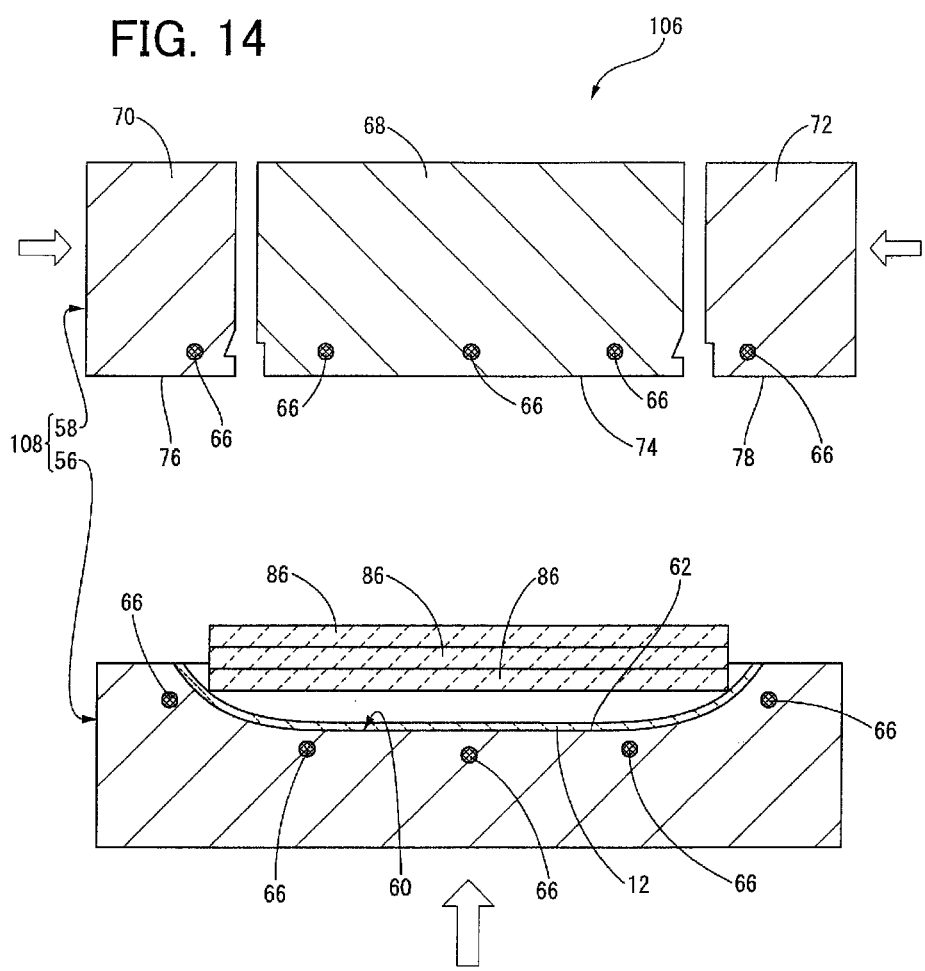
FIG. 14 is a schematic view showing an example of a step implemented following the step shown in FIG. 13, in which the base-layer-portion ligneous material and the surface layer portion formed by the heating and pressing device are set in a forming mold of a heating and pressing device.

Successively, the intended interior part 10 is produced by using the surface layer portion 12 formed as described above, the plurality of base-layer-portion ligneous materials 86 the fiber cell walls of which have been impregnated with the aqueous phenolic resin solution 40, and a heating and pressing device 106 shown in FIG. 14, which is substantially identical in construction with the heating and pressing device 52 described above with respect to the preceding embodiment. A forming mold 108 provided in the heating and pressing device 106 is identical in construction with the forming mold 54 provided in the heating and pressing device 52, except for elimination of the plurality of deformation preventive portions 64 and the moving mechanism for moving the deformation preventive portions 64. Therefore, the same reference signs as used in FIGS. 6-9 will be used in FIG. 14, to identify the elements and portions of the forming mold 108 of the heating and pressing device 106 which are identical with the corresponding elements and portions of the forming mold 54 of the heating and pressing device 52. Those elements and portions of the forming mold 108 will not be described redundantly.

To produce the interior part 10 by using the heating and pressing device 106, the surface layer portion 12 and the plurality of base-layer-portion ligneous materials 86 are accommodated in the recess 60 of the lower die 56 while the forming mold 108 is placed in its open state with the upper die 58 and the lower die 56 being spaced apart from each other, as shown in FIG. 14.

At this time, the surface layer portion 12 is disposed such that the entirety of the decorative design surface 18 is held in contact with the cavity surface 62 of the recess 60, while the plurality of base-layer-portion ligneous materials 86 in the form of flat sheets are superposed on each other in the direction of thickness, with a predetermined space being left with respect to the surface of the surface layer portion 12 opposite to the decorative design surface 18.

While or before the surface layer portion 12 and the plurality of base-layer-portion ligneous materials 86 are accommodated in the recess 60, the cavity surface 62 of the lower die 56, and the pressure surfaces 74, 76 and 78 of the first, second and third split-die members 68, 70 and 72 of the upper die 58 are heated to and kept at the curing point of the phenolic resin, by the plurality of cartridge heaters 66 embedded in the lower die 56 and the upper die 58.

Described more specifically, the cavity surface 62 and the pressure surfaces 68, 70 and 72 are heated to and kept at a temperature of about 150° C.

Figure 15:
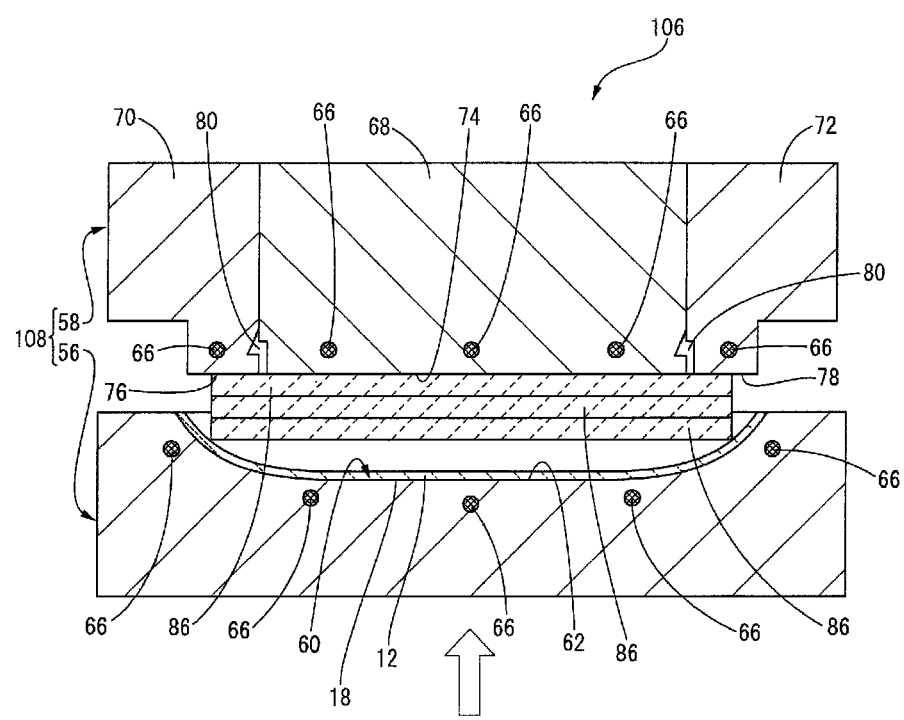
FIG. 15 is a schematic view showing an example of a step implemented following the step shown in FIG. 14, in which an upper die of the forming mold is brought into contact with an upper surface of the base-layer-portion ligneous material, in the process of a closing action of the forming mold.

Then, the lower die 56 is moved upwards until the upper surface of the uppermost one of the plurality of mutually superposed base-layer-portion ligneous materials 86 placed on the surface layer portion 12 is brought into contact with the first, second and third pressure surfaces 74, 76 and 78 of the first, second and third split-die members 68, 70 and 72, as shown in FIG. 15, and the lower die 56 is moved upwards by a further distance so that the plurality of base-layer-portion ligneous materials 86 are pressed by the first, second and third pressure surfaces 74, 76 and 78 in the direction in which the surface layer portion 12 and the plurality of base-layer-portion ligneous materials 86 are superposed on each other. In this state of pressing of the plurality of base-layer-portion ligneous materials 86, these ligneous materials 86 are heated by the first, second and third pressure surfaces 74, 76 and 78 and the cavity surface 62 of the lower die 56 which are heated by the cartridge heaters 66. Thus, the plurality of base-layer-portion ligneous materials 86 are subjected to the flow molding process during the heating and pressing operations performed as described above.

Namely, the plurality of base-layer-portion ligneous materials 86 impregnated with the aqueous phenolic resin solution 40 to cut the hydrogen bonds are subjected to the heating and pressing operations so that shearing forces act on the fiber cells of each base-layer-portion ligneous material 86 during the heating and pressing operations, with a result of a change of the relative positions of the fiber cells. Thus, each base-layer-portion ligneous material 86 is subjected to the flow molding process, to cause its flow within the forming cavity 84 formed between the upper die 58 and the lower die 56.

Regarding the pressing operation performed on the plurality of base-layer-portion ligneous materials 86, it is noted that each base-layer-portion ligneous material 86 is the flat sheet sliced from the lumber in the direction perpendicular to the direction of extension of the fibers, and is pressed in the direction of extension of the fibers. Further, each base-layer-portion ligneous material 86 is the flat sheet having a thickness smaller than that of the base-layer-portion ligneous material 28 in the form of a rectangular block, so that each base-layer-portion ligneous material 86 can be impregnated with the aqueous phenolic resin solution 40, more sufficiently even in its central part in the direction of its thickness. Accordingly, the relative positions of the fiber cells of each base-layer-portion ligneous material 86 can be more smoothly and rapidly changed by a larger amount as a result of the heating and pressing operations performed thereon, than those of the fibers cells of a base-layer-portion ligneous material sliced from a lumber in the direction of extension of the fibers, or the base-layer-portion ligneous material 28 in the form of the rectangular block.

As a result, each base-layer-portion ligneous material 86 is permitted to more smoothly and rapidly flow within the forming cavity 84 by a sufficiently large amount, so that the forming cavity 84 and the fixing-hook forming cavities 80 open to the forming cavity 84 can be entirely filled by the base-layer-portion ligneous materials 86. In addition, the smooth flow of each base-layer-portion ligneous material 86 within the forming cavity 84 makes it possible to effectively reduce the pressing force required to be applied to the base-layer-portion ligneous materials 86 so that the forming cavity 84 and the fixing-hook forming cavities 80 are filled by the base-layer-portion ligneous materials 86.

During the flow molding operation performed on the plurality of base-layer-portion ligneous materials 86, the surface layer portion 12 on which the base-layer-portion ligneous materials 86 are placed and which is accommodated in the forming cavity 84 is subjected to heating and pressing operations similar to those performed on the base-layer-portion ligneous materials 86. However, since the phenolic resin that is a thermosetting resin with which the surface layer portion 12 is impregnated has already been cured, a flow molding process does not take place with respect to the surface layer portion 12 during the heating and pressing operations within the forming cavity 84, so that the decorative design surface 18 will not suffer from deformation causing an enlargement of its area. Therefore, the decorative design surface 18 of the surface layer portion 12 is completely protected against deformation or collapse of the woody grain 20 due to the heating and pressing operations performed on the surface layer portion 12 within the forming cavity 84.

The base-layer-portion ligneous materials 86 filling the forming cavity 84 and the fixing-hook forming cavities 80 is kept pressed or compacted by and between the lower die 56 and the upper die 58, for a predetermined length of time. The thus compacted base-layer-portion ligneous materials 86 are heated by the first, second and third pressure surfaces 74, 76 and 78 and the cavity surface 62, to the curing point of the phenolic resin.

Thus, the base-layer-portion ligneous materials 86 are given (formed to have) a permanent shape corresponding to a portion of the forming cavity 84 other than the portion in which the surface layer portion 12 is accommodated, whereby the base layer portion 14 is eventually formed. At the same time, the fixing hooks 24, 24 are formed integrally with the base layer portion 14 such that the fixing hooks 24, 24 extend from the back surface 22. Further, the surface layer portion 12 and the base layer portion 14 are formed integrally with each other in the forming cavity 84.

Then, the lower die 56 is moved downwards apart from the upper die 58, and the surface layer portion 12 and the base layer portion 14 formed integrally with each other are removed from the lower and upper dies 56 and 58, whereby the interior part 10 having the structure shown in FIG. 1 is eventually obtained.

It will be understood from the foregoing description that the method according to the present embodiment permits advantageous production of the interior part 10 having the excellent properties described above.

In particular, the present method uses the base-layer-portion ligneous materials 86 each in the form of a comparatively thin flat sheet, which can be sufficiently impregnated with the phenolic resin even in its central part in the direction of its thickness, making it possible to effectively reduce the pressing force required to be applied to the base-layer-portion ligneous materials 86 so that the forming cavity 84 is filled by the base-layer-portion ligneous materials 86 in the flow molding process. Accordingly, the pressing force to be applied via the base-layer-portion ligneous materials 86 to the surface layer portion 12 accommodated together with the base-layer-portion ligneous materials 86 in the forming cavity 84 can be reduced. As a result, the surface layer portion 12 is highly effectively protected against scratching or breakage by the pressing force applied thereto via the base-layer-portion ligneous materials 86 in the flow molding process.

Further, the present method using the plurality of base-layer-portion ligneous materials 86 each in the form of a comparatively thin sheet that can be sufficiently impregnated with the phenolic resin even in its central part in the direction of its thickness permits the base-layer-portion ligneous materials 86 to more rapidly fill the forming cavity 84 in the flow molding process, so that the required cycle time to produce the desired interior part 10 can be significantly reduced, whereby the productivity of the interior part 10 can be effectively improved.

While the embodiments of this invention have been described above for illustrative purpose only, it is to be understood that the invention is not limited to the details of the illustrated embodiments.

The same kind of phenolic resin is used as a thermosetting resin with which the fiber cell walls of the surface-layer-portion ligneous material 26 and the base-layer-portion ligneous materials 28, 86 are impregnated, in the first embodiment wherein the surface-layer-portion ligneous material 26 and the base-layer-portion ligneous material 28 are concurrently subjected to the flow molding operation in the forming cavity 84, and also in the second embodiment wherein the already formed surface layer portion 12 and the plurality of base-layer-portion ligneous materials 86 are accommodated in the forming cavity 84, and only the base-layer-portion ligneous materials 86 are subjected to the flow molding operation. However, different kinds of phenolic resin may be used as a thermosetting resin with which the surface-layer-portion ligneous material 26 is impregnated, and as a thermosetting resin with which the base-layer-portion ligneous materials 28, 86 are impregnated.

Namely, a thermosetting resin having a curing point higher than that of a thermosetting resin with which the surface-layer-portion ligneous material 26 is impregnated may be used for the base-layer-portion ligneous materials 28, 86. In this case, the heating temperature of the cavity surface 62 of the lower die 56 and the first, second and third pressure surfaces 74, 76 and 78 of the upper die 58 is determined to be the curing point of the thermosetting resin for the base-layer-portion ligneous materials 28, 86, according to the method in the above-described first embodiment, so that the surface layer portion 12 can be formed as a result of curing of the thermosetting resin contained in the surface-layer-portion ligneous material 26, while the base-layer-portion ligneous materials 28, 86 remain in a fluid state in the forming cavity 84. Namely, the interior part 10 is obtained as in the method according to the first embodiment, without heating the cavity surface 62 and the first, second and third pressure surfaces 74, 76 and 78 to the respective different temperatures. Accordingly, the present modified embodiment permits production of the desired interior part 10, by using a device which is simpler in construction and less costly and which is not provided with a device to control the temperatures of the cavity surface 62 and the first, second and third pressure surfaces 74, 76 and 78 to the respective different temperatures.

Alternatively, a thermoplastic resin (such as polymethylmethacrylate and polyacrylonitrile) may be used for the surface-layer-portion ligneous material 26 and the base-layer-portion ligneous materials 28, 86. In this case, however, a treatment such as a known treatment to acetylate the cellulose of the fiber cells of the surface-layer-portion ligneous material 26 and the base-layer-portion ligneous materials 28, 86 may be required to be performed to cut the hydrogen bonds among the fiber cells of those ligneous materials 26, 28, 86, before those ligneous materials 26, 28, 86 are impregnated with the thermoplastic resin.

The surface-layer-portion ligneous material 26 and the base-layer-portion ligneous materials 28, 86 are impregnated with the thermoplastic resin, by using the resin impregnating device 30 shown in FIG. 5, for example, by initially impregnating the fiber cell walls of the ligneous materials 26, 28, 86 with a prepolymer or monomer of the thermoplastic resin, and then polymerizing the prepolymer or monomer. The surface layer portion 12 is formed as a result of curing of the thermoplastic resin thus contained in the surface-layer-portion ligneous material 26.

To obtain the desired interior part 10, the surface layer portion 12 formed as described above, and the base-layer-portion ligneous material 28 or materials 86 the fiber cell walls of which have been impregnated with the thermoplastic resin in a cured state are accommodated within the forming cavity 84 of the forming mold 54. Then, the surface layer portion 12 and the base-layer-portion ligneous materials 28, 86 are subjected to the heating and pressing operations, so that the thermoplastic resin contained in the base-layer-portion ligneous materials 28, 86 is once turned into a molten state, to permit the base-layer-portion ligneous materials 28, 86 to be subjected to a flow molding operation. At this time, the surface layer portion 12 is also subjected to the heating and pressing operations so that the thermoplastic resin contained in the surface layer portion 12 is once turned into a molten or softened state. However, the use of the forming mold 54 provided with the deformation preventive portions 64 as shown in FIG. 6 prevents deformation of the surface layer portion 12, which would cause an enlargement of the decorative design surface 18. Subsequently, the base-layer-portion ligneous materials 28, 86 are cooled to re-cure the thermoplastic resin contained therein, so that the base layer portion 14 is formed integrally with the surface layer portion 12, whereby the desired interior part 10 is obtained.

The thermoplastic resin with which the fiber cell walls of the surface-layer-portion ligneous material 26 is impregnated, and the thermoplastic resin with which the fiber cell walls of the base-layer-portion ligneous materials 28, 86 are impregnated may be of the same kind or respective different kinds.

Where the same kind of thermoplastic resin is used for both the surface-layer-portion ligneous material 26 and the base-layer-portion ligneous materials 28, 86, the cavity surface 62 of the forming mold 54, 108 is preferably heated to a temperature lower than the melting point of the thermoplastic resin, while the first, second and third pressure surfaces 74, 76 and 78 are preferably heated to a temperature higher than the melting point of the thermoplastic resin, so that the base-layer-portion ligneous materials 28, 86 are subjected to the flow molding operation. Thus, the flow molding of the base-layer-portion ligneous materials 28, 86 can be advantageously conducted without a risk of deformation of the surface layer portion 12, which would cause an enlargement of the decorative design surface 18. In this case, the forming mold 108 not provided with the deformation preventive portions 64 is preferably employed.

Where the different kinds of thermoplastic resin are respectively used for the surface-layer-portion ligneous material 26 and the base-layer-portion ligneous materials 28, 86, the thermoplastic resin having a melting point higher than that of the thermoplastic resin used for the base-layer-portion ligneous materials 28, 86 is preferably used for the surface-layer-portion ligneous material 26. Further, the cavity surface 62 and the first, second and third pressure surfaces 74, 76 and 78 of the forming mold 54, 108 are preferably heated to a temperature which is lower than the melting point of the thermoplastic resin used for the surface-layer-portion ligneous material 26, and which is higher than the melting point of the thermoplastic resin used for the base-layer-portion ligneous materials 28, 86, so that the base-layer-portion ligneous materials 28, 86 are subjected to the flow molding operation. Thus, the flow molding of the base-layer-portion ligneous materials 28, 86 can be advantageously conducted without a risk of deformation of the surface layer portion 12, which would cause an enlargement of the decorative design surface 18. In this case, too, the forming mold 108 not provided with the deformation preventive portions 64 is preferably employed.

In the above-described first embodiment wherein the surface-layer-portion ligneous material 26 and the base-layer-portion ligneous material 28 are subjected to the flow molding operation within one forming cavity 84, the base-layer-portion ligneous material 28 takes the form of a single rectangular block. However, this base-layer-portion ligneous material 28 may be replaced by base-layer-portion ligneous materials 28 in the form of a plurality of sheets.

Where the base-layer-portion ligneous materials 28, 86 in the form of the plurality of sheets are used in the above-described first or second embodiment, one of the two adjacent base-layer-portion ligneous materials 28, 86 among the plurality of base-layer-portion ligneous materials 28, 86 accommodated within the forming cavity 84, which one base-layer-portion ligneous material 28, 86 (hereinafter referred to as an upper base-layer-portion ligneous material 28, 86) is more distant from the surface-layer-portion ligneous material 26 or the surface layer portion 12, than the other one of the two adjacent base-layer-portion ligneous materials 28, 86, preferably has a higher degree of fluidity in the flow molding process, than the other base-layer-portion ligneous material 28, 86 (hereinafter referred to as a lower base-layer-portion ligneous material 28, 86) which is nearer to the surface-layer-portion ligneous material 26 or the surface layer portion 12. In this case, it is possible to minimize an influence of the flow molding pressure on the surface-layer-portion ligneous material 26 or the surface layer portion 12 in the flow molding operation on the base-layer-portion ligneous materials 28, 86, and to advantageously prevent damaging of the surface-layer-portion ligneous material 26 or the surface layer portion 12 due to the influence of the flow molding pressure.

To give the upper base-layer-portion ligneous material 28, 86 a higher degree of fluidity in the flow molding process than the lower base-layer-portion ligneous material 28, 86, the amount of the resin to be contained in a unit volume of the upper base-layer-portion ligneous material 28, 86 is made larger than that of the resin to be contained in the unit volume of the lower base-layer-portion ligneous material 28, 86. The upper base-layer-portion ligneous material 28, 86 can also be given a higher degree of fluidity by impregnating the upper base-layer-portion ligneous material 28, 86 with a thermosetting resin which has a curing point higher than that of a thermosetting resin to be contained in the lower base-layer-portion ligneous material 28, 86, or by impregnating the upper base-layer-portion ligneous material 28, 86 with a thermoplastic resin which has a melting point lower than that of a thermoplastic resin to be contained in the lower base-layer-portion ligneous material 28, 86.

The upper and lower base-layer-portion ligneous materials 28, 86 can be impregnated with respective different amounts of the resin per unit volume, independently of each other by using the resin impregnating device 30 shown in FIG. 5, under respective different conditions, for instance, by performing the impregnating operations at respective different pressure values to which the pressure within the pressure vessel 32 is reduced and raised, or for respective different periods of time. Alternatively, the lower base-layer-portion ligneous material 28, 86 is obtained from a hardwood or broadleaf tree lumber, while the upper base-layer-portion ligneous material 28, 86 is obtained from a conifer lumber the fiber cell walls of which are more easily impregnated with a resin, than the hardwood lumber.

The directions in which the surface-layer-portion ligneous material 26 and the base-layer-portion ligneous material 28, 86 are sliced from a lumber are not limited to those described with respect to the illustrated embodiments. The surface-layer-portion ligneous material 26 may be sliced from a lumber in the direction perpendicular to the direction of extension of the fibers, and the base-layer-portion ligneous material 28, 86 may be sliced from a lumber in the direction parallel to the direction of extension of the fibers.

Where the flow molding operation is performed on a plurality of base-layer-portion ligneous materials 86 superposed on each other and accommodated in the forming cavity 84, as in the illustrated second embodiment, one or more of the base-layer-portion ligneous materials 86 is/are sliced from a lumber in the direction perpendicular to the direction of extension of the fibers, while the other base-layer-portion ligneous material or materials 86 is/are sliced from a lumber in the direction parallel to the direction of extension of the fibers, so that the individual base-layer-portion ligneous materials 86 have different degrees of fluidity in the flow molding process.

In the illustrated first embodiment, the surface-layer-portion ligneous material 26 and the base-layer-portion ligneous material 28 are subjected to the flow molding operation, by using the forming mold 54 having the deformation preventive portions 64, and by heating the cavity surface 62, and the first, second and third pressure surfaces 74, 76 and 78 of the forming mold 54 to the respective different temperatures. However, the forming mold 54 need not be provided with the deformation preventive portions 64, if it is possible to prevent deformation of the surface-layer-portion ligneous material 26 and a consequent enlargement of the area of the decorative design surface 18, by controlling the heating temperatures of the cavity surface 62 and the first, second and third pressure surfaces 74, 76 and 78.

The cartridge heaters 66 provided as means for heating the cavity surface 62 and the first, second and third pressure surfaces 74, 76 and 78 may be replaced by any other heating means known in the art.

Further, the ligneous materials used for forming the surface layer portion and the base layer portion may be bamboos in place of lumbers.

The form of the base-layer-portion ligneous material is not limited to the rectangular block or flat sheets used in the illustrated embodiments. For instance, the base-layer-portion ligneous material may take various forms obtained by crushing, cutting or chipping desired lumbers or bamboos. Irrespective of the specific form of the base-layer-portion ligneous material, the fiber cell walls of the base-layer-portion ligneous material are impregnated with a resin.

Although the fiber cells of the surface-layer-portion ligneous material 26 used according to the present invention are required to be impregnated with a resin material, the walls of the fiber cells need not be impregnated with the resin material. For example, the resin material is merely contained in the pores formed within the fiber cells. For instance, this modification is employed where the surface layer portion 12 which has been formed of the surface-layer-portion ligneous material 26, and the base-layer-portion ligneous materials 86 are accommodated in the forming cavity 84, and the base-layer-portion ligneous materials 86 are subjected to the flow molding operation.

The fixing hooks 24 integrally formed so as to extend from the back surface 22 of the base layer portion 14 may be eliminated. Where the fixing hooks 24 are formed so as to extend from the back surface 22 of the base layer portion 14, the fixing hooks 24 may be formed integrally with the back surface 22 of the base layer portion 14, by stamping blocks of a ligneous material impregnated with the same kind of resin as used for the base-layer-portion ligneous materials 28, 86, or blocks of that kind of resin, to form the fixing hooks 24.

Namely, where the interior part 10 is produced by the method of according to the above-described second embodiment, by using the forming mold 108, in the manner shown in FIGS. 14 and 15, for instance, the above-indicated blocks of the ligneous material impregnated with the same kind of resin as used for the base-layer-portion ligneous materials 86, or the above-indicated blocks of that kind of resin are placed on the uppermost one of the plurality of base-layer-portion ligneous materials 86, at positions corresponding to the fixing-hook forming cavities 80 formed in the upper die 58. These blocks are heated and pressed between the upper die 58 and the uppermost base-layer-portion ligneous material 86, while the surface layer portion 12 and the plurality of base-layer-portion ligneous materials 86 are heated and pressed by and between the upper die 58 and the lower die 56, so that the ligneous material or the resin used for forming the fixing hooks flows to fill the fixing-hook forming cavities 80. Then, the resin contained in the ligneous material or the resin used for the fixing hooks is cured together with the resin contained in the base-layer-portion ligneous materials 86. Thus, the fixing hooks 24 are formed integrally so as to extend from the back surface 22 of the base layer portion 14.

The upper die 58 of the forming mold 108 may have resin flow passages through which a molten resin flows into the fixing-hook forming cavities 80, and a known injecting device may be provided to inject the molten resin into the resin flow passages to fill the fixing-hook forming cavities 80 with the molten resin, while the desired interior part 10 is formed by and between the upper die 58 and the lower die 56 by the method according to the illustrated first or second embodiment, so that the fixing hooks 24 are formed integrally with the back surface 22 of the base layer portion 14. Alternatively, the produced interior part 10 may be subjected to an outsert molding operation to form the fixing hooks 24 integrally with the back surface 22 of the base layer portion 14.

The base layer portion 14 may be provided with an integrally formed member or portion, such as a cushioning material, other than the fixing hooks 24, by the methods according to the illustrated several embodiments.

Further, the principle of the present invention is equally applicable to a formed ligneous body other than an automotive vehicle interior part, and a method of producing the same.

It is to be understood that the present invention may be embodied with various changes, modifications and improvements not described herein, which may occur to those skilled in the art, without departing from the spirit and scope of this invention.

NOMENCLATURE OF REFERENCE SIGNS

10: Automotive vehicle interior part  12: Surface layer portion
14: Base layer portion  18: Decorative design surface
26: Surface-layer-portion ligneous material
28, 86: Base-layer-portion ligneous material -continued

NOMENCLATURE OF REFERENCE SIGNS

30: Resin impregnating device
64: Deformation preventive portion
88: Surface-layer-portion forming mold
54, 108: Forming mold
84, 104: Forming cavity

The invention claimed is:

1. A formed ligneous body having a surface, at least a part of which defines a decorative design surface, and a non-decorative back surface, the formed ligneous body being produced by subjecting a ligneous material wherein hydrogen bonds among fiber cells have been cut, to a flow molding process, wherein the ligneous material is heated and pressed in a forming cavity, to apply shearing forces to the fiber cells to change relative positions of said fiber cells, for permitting flow of said ligneous material to fill the forming cavity, whereby said ligneous material filling the forming cavity is compressed and shaped, said formed ligneous body comprising:
 a surface layer portion having said decorative design surface; and
 a base layer portion, which is a remainder of the formed ligneous body other than said surface layer portion, and which is integral with said surface layer portion;
 wherein the fiber cells of said surface layer portion are impregnated with a first resin material in a cured state, and the fiber cells of said base layer portion are impregnated with a second resin material in a cured state, said surface layer portion and said base layer portion being formed in the flow molding process such that an amount of change of the relative positions of the fiber cells of said surface layer portion caused in the flow molding process is smaller than an amount of change of the relative positions of the fiber cells of said base layer portion caused in the flow molding process, and
 wherein the surface layer portion directly contacts the base layer portion that is integral therewith.

2. A formed ligneous body having a surface at least a part of which defines a decorative design surface, and a non-decorative back surface, the formed ligneous body being produced by subjecting a ligneous material wherein hydrogen bonds among fiber cells have been cut, to a flow molding process, wherein the ligneous material is heated and pressed in a forming cavity, to apply shearing forces to the fiber cells to change relative positions of said fiber cells, for permitting flow of said ligneous material to fill the forming cavity, whereby said ligneous material filling the forming cavity is compressed and shaped, said formed ligneous body comprising:
 a surface layer portion having said decorative design surface; and
 a base layer portion, which is a remainder of the formed ligneous body other than said surface layer portion, and which is integral with said surface layer portion;
 wherein the fiber cells of said surface layer portion are impregnated with a first resin material in a cured state, and the fiber cells of said base layer portion are impregnated with a second resin material in a cured state, and only said base layer portion is formed in the flow molding process, and
 wherein the surface layer portion directly contacts the base layer portion that is integral therewith.

3. A method of producing a formed ligneous body having a surface at least a part of which serves as a decorative design surface, and a non-decorative back surface, by subjecting a ligneous material wherein hydrogen bonds among fiber cells have been cut, to a flow molding process wherein the ligneous material is heated and pressed in a forming cavity, to apply shearing forces to the fiber cells to change relative positions of said fiber cells, for permitting flows of said ligneous material to fill said forming cavity, and said ligneous material filling said forming cavity is compressed and shaped, said method comprising:
 a step of providing, as said ligneous material, a surface-layer-portion ligneous material for forming a surface layer portion having said decorative design surface, and a base-layer-portion ligneous material for forming a base layer portion which is a remainder of the formed ligneous body other than said surface layer portion;
 a step of impregnating the fiber cells of said surface-layer-portion ligneous material with a first resin material;
 a step of impregnating the fiber cells of said base-layer-portion ligneous material with a second resin material;
 a step of accommodating, in said forming cavity, said surface-layer-portion ligneous material which has been impregnated with said first resin material, and said base-layer-portion ligneous material which has been impregnated with said second resin material, such that said surface-layer-portion ligneous material and said base-layer-portion ligneous material are superposed on each other;
 a step of curing said first resin material contained in said surface-layer-portion ligneous material accommodated in said forming cavity to form said surface layer portion; and
 a step of subjecting said base-layer-portion ligneous material accommodated in said forming cavity to said flow molding process such that said base-layer-portion ligneous material is compressed in a direction of mutual superposition of said surface-layer-portion ligneous material and said base-layer-portion ligneous material, while substantially preventing deformation of said surface layer portion formed in said forming cavity, which deformation would cause an enlargement of an area of said decorative design surface, said second resin material contained in said base-layer-portion ligneous material being subsequently cured to form said base layer portion integrally with said surface layer portion formed in said forming cavity,
 wherein the surface layer portion directly contacts the base layer portion and is integral therewith.

4. A method of producing a formed ligneous body having a surface at least a part of which serves as a decorative design surface, and a non-decorative back surface, by subjecting a ligneous material wherein hydrogen bonds among fiber cells have been cut, to a flow molding process wherein the ligneous material is heated and pressed in a forming cavity, to apply shearing forces to the fiber cells to change relative positions of said fiber cells, for permitting flows of said ligneous material to fill said forming cavity, and said ligneous material filling said forming cavity is compressed and shaped, said method comprising:
 a step of providing, as said ligneous material, a surface-layer-portion ligneous material for forming a surface layer portion having said decorative design surface, and a base-layer-portion ligneous material for forming a base layer portion which is a remainder of the formed ligneous body other than said surface layer portion;

a step of impregnating the fiber cells of said surface-layer-portion ligneous material with a first resin material, and curing said first resin material to form said surface layer portion;

a step of impregnating the fiber cells of said base-layer-portion ligneous material with a second resin material;

a step of accommodating, in said forming cavity, said surface layer portion formed of said surface-layer-portion ligneous material, and said base-layer-portion ligneous material which has been impregnated with said second resin material, such that said surface layer portion and said base-layer-portion ligneous material are superposed on each other; and a step of subjecting said base-layer-portion ligneous material accommodated in said forming cavity to said flow molding process such that said base-layer-portion ligneous material is compressed in a direction of mutual superposition of said surface layer portion and said base-layer-portion ligneous material, said second resin material contained in said base-layer-portion ligneous material being subsequently cured to form said base layer portion integrally with said surface layer portion accommodated in said forming cavity, wherein the surface layer portion directly contacts the base layer portion and is integral therewith.

5. The method according to claim 3, wherein said surface-layer-portion ligneous material takes the form of a sheet.

6. The method according to claim 4, wherein said surface-layer-portion ligneous material takes the form of a sheet.

7. The method according to claim 3, wherein said base-layer-portion ligneous material takes the form of a laminar body consisting of a plurality of sheets superposed on each other in a direction of their thickness.

8. The method according to claim 4, wherein said base-layer-portion ligneous material takes the form of a laminar body consisting of a plurality of sheets superposed on each other in a direction of their thickness.

9. The method according to claim 7, wherein one of the two adjacent sheets among the plurality of sheets of the laminar body superposed on the surface-layer-portion ligneous material accommodated within the forming cavity, which one sheet is more distant from the surface-layer-portion ligneous material than the other one of the two adjacent sheets, has a higher degree of fluidity in the flow molding process, than the other one of the two adjacent sheets, which is nearer to the surface-layer-portion ligneous material.

10. The method according to claim 8, wherein one of the two adjacent sheets among the plurality of sheets of the laminar body superposed on the surface layer portion accommodated within the forming cavity, which one sheet is more distant from the surface layer portion than the other one of the two adjacent sheets, has a higher degree of fluidity in the flow molding process, than the other one of the two adjacent sheets, which is nearer to the surface layer portion.

11. The formed ligneous body according to claim 1, wherein the surface layer portion is a slice of lumber.

12. The formed ligneous body according to claim 2, wherein the surface layer portion is a slice of lumber.

* * * * *